(12) United States Patent
Rodriguez et al.

(10) Patent No.: US 8,279,926 B2
(45) Date of Patent: Oct. 2, 2012

(54) DYNAMIC STREAMING WITH LATTICED REPRESENTATIONS OF VIDEO

(75) Inventors: Arturo A. Rodriguez, Norcross, GA (US); Gregory Shepherd, Eugene, OR (US); Benjamin M. Cook, Flowery Branch, GA (US)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 12/819,157

(22) Filed: Jun. 18, 2010

(65) Prior Publication Data

US 2010/0322302 A1 Dec. 23, 2010

Related U.S. Application Data

(60) Provisional application No. 61/218,319, filed on Jun. 18, 2009.

(51) Int. Cl.
*H04N 11/02* (2006.01)

(52) U.S. Cl. .................. 375/240.1; 375/240.25

(58) Field of Classification Search . 375/240.01–240.29
See application file for complete search history.

(56) References Cited

U.S. PATENT DOCUMENTS

| | | | |
|---|---|---|---|
| 5,440,345 A | 8/1995 | Shimoda | |
| 5,606,359 A | 2/1997 | Youden | |
| 5,734,783 A | 3/1998 | Shimoda | |
| 5,828,370 A | 10/1998 | Moeller et al. | |
| 5,917,830 A | 6/1999 | Chen et al. | |
| 5,917,988 A | 6/1999 | Eto | |
| 5,949,948 A | 9/1999 | Krause et al. | |
| 5,963,260 A | 10/1999 | Bakhmutsky | |
| 6,201,927 B1 | 3/2001 | Commer | |
| 6,222,979 B1 | 4/2001 | Willis et al. | |
| 6,304,714 B1 | 10/2001 | Krause | |
| 6,393,057 B1 | 5/2002 | Thoreau et al. | |
| 6,512,552 B1 | 1/2003 | Subramanian | |
| 6,658,199 B1 | 12/2003 | Hallberg | |
| 6,806,909 B1 | 10/2004 | Radha et al. | |
| 6,909,743 B1 | 6/2005 | Ward et al. | |
| 6,912,251 B1 | 6/2005 | Ward et al. | |

(Continued)

FOREIGN PATENT DOCUMENTS

EP 0 812 112 A2 12/1997

(Continued)

OTHER PUBLICATIONS

U.S. Appl. No. 12/819,157, filed Jun. 18, 2010, entitled "Dynamic Streaming with Latticed Representations of Video", Rodriguez et al.

(Continued)

*Primary Examiner* — David Czekaj
*Assistant Examiner* — Leron Beck
(74) *Attorney, Agent, or Firm* — Merchant & Gould

(57) ABSTRACT

In one embodiment, a method that partitions a first sequence of pictures into plural representations, encodes each of the plural representations independently of each other with a common time base, provides a first portion of the plural encoded representations based on a first network condition, the first portion having a first bit-rate, and provides a second portion of the plural encoded representations having a second bit-rate different than the first bit-rate, wherein a switch from providing the first portion to providing the second portion is responsive to a second network condition different than the first network condition.

20 Claims, 9 Drawing Sheets

U.S. PATENT DOCUMENTS

| | | |
|---|---|---|
| 7,027,713 B1 | 4/2006 | Hallberg |
| 7,050,603 B2 | 5/2006 | Rhoads |
| 7,053,874 B2 | 5/2006 | Koyama |
| 7,185,018 B2 | 2/2007 | Archbold |
| 7,243,193 B2 | 7/2007 | Walmsley |
| 7,317,839 B2 | 1/2008 | Holcomb |
| 7,397,858 B2 * | 7/2008 | Garrido et al. ........... 375/240.29 |
| 7,577,198 B2 | 8/2009 | Holcomb |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,656,410 B2 | 2/2010 | Chiu |
| 2002/0075402 A1 | 6/2002 | Robson et al. |
| 2002/0176025 A1 | 11/2002 | Kim |
| 2003/0043847 A1 | 3/2003 | Haddad |
| 2003/0072555 A1 | 4/2003 | Yap et al. |
| 2003/0081934 A1 | 5/2003 | Kirmuss |
| 2003/0093418 A1 | 5/2003 | Archbold |
| 2003/0093800 A1 | 5/2003 | Demas et al. |
| 2003/0113098 A1 | 6/2003 | Willis |
| 2003/0123849 A1 | 7/2003 | Nallur |
| 2004/0078186 A1 | 4/2004 | Nair |
| 2004/0179619 A1 | 9/2004 | Tian et al. |
| 2004/0218816 A1 | 11/2004 | Hannuksela |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0226323 A1 * | 10/2005 | Secker ..................... 375/240.11 |
| 2005/0229225 A1 | 10/2005 | Klausberger et al. |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0129914 A1 | 6/2006 | Ellis |
| 2006/0132822 A1 | 6/2006 | Walmsley |
| 2006/0147121 A1 | 7/2006 | Maeda et al. |
| 2006/0222319 A1 | 10/2006 | Russ |
| 2006/0294171 A1 | 12/2006 | Bossen |
| 2007/0019724 A1 | 1/2007 | Tourapis |
| 2007/0030186 A1 | 2/2007 | Archbold |
| 2007/0030356 A1 | 2/2007 | Yea |
| 2007/0030818 A1 | 2/2007 | Bahnck et al. |
| 2007/0091997 A1 | 4/2007 | Fogg et al. |
| 2007/0109409 A1 | 5/2007 | Yea |
| 2007/0112721 A1 | 5/2007 | Archbold |
| 2007/0116426 A1 | 5/2007 | Toma et al. |
| 2007/0140358 A1 | 6/2007 | Schwartz et al. |
| 2007/0153679 A1 | 7/2007 | Jost et al. |
| 2007/0172133 A1 | 7/2007 | Kim |
| 2007/0223595 A1 | 9/2007 | Hannuksela et al. |
| 2007/0245382 A1 | 10/2007 | Doi et al. |
| 2008/0055463 A1 | 3/2008 | Lerner |
| 2008/0115175 A1 | 5/2008 | Rodriguez |
| 2008/0115176 A1 | 5/2008 | Rodriguez |
| 2008/0117985 A1 | 5/2008 | Chen |
| 2008/0131079 A1 | 6/2008 | Toma |
| 2008/0137742 A1 | 6/2008 | Chen |
| 2008/0163308 A1 | 7/2008 | Kim |
| 2008/0225951 A1 | 9/2008 | Young |
| 2008/0247463 A1 | 10/2008 | Buttimer |
| 2008/0260045 A1 | 10/2008 | Rodriguez et al. |
| 2009/0002379 A1 | 1/2009 | Baeza |
| 2009/0003446 A1 | 1/2009 | Wu |
| 2009/0003447 A1 | 1/2009 | Christoffersen |
| 2009/0028247 A1 | 1/2009 | Shuh |
| 2009/0034627 A1 | 2/2009 | Rodriguez et al. |
| 2009/0034633 A1 | 2/2009 | Rodriguez et al. |
| 2009/0073928 A1 | 3/2009 | Power |
| 2009/0100482 A1 | 4/2009 | Rodriguez et al. |
| 2009/0116558 A1 | 5/2009 | Chen |
| 2009/0141168 A1 | 6/2009 | Chen et al. |
| 2009/0147859 A1 * | 6/2009 | McGowan et al. ...... 375/240.26 |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0210412 A1 | 8/2009 | Oliver |
| 2009/0214178 A1 | 8/2009 | Takahashi |
| 2009/0220012 A1 | 9/2009 | Rodriguez et al. |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez et al. |
| 2009/0313662 A1 | 12/2009 | Rodriguez |
| 2009/0313668 A1 | 12/2009 | Shepherd |
| 2009/0323822 A1 | 12/2009 | Rodriguez et al. |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027682 A1 | 2/2010 | Jeon |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0215338 A1 | 8/2010 | Rodriguez |
| 2010/0218232 A1 | 8/2010 | Rodriguez |
| 2010/0293571 A1 | 11/2010 | Rodriguez |

FOREIGN PATENT DOCUMENTS

| | | |
|---|---|---|
| EP | 1 292 138 A2 | 3/2003 |
| EP | 1 328 119 A1 | 7/2003 |
| JP | 05-236465 A | 9/1993 |
| KR | 10-2004-0054708 A | 6/2004 |
| WO | WO 00/00981 A2 | 1/2000 |
| WO | WO 00/62552 A2 | 10/2000 |
| WO | WO 01/43440 A | 6/2001 |
| WO | WO 01/63774 A | 8/2001 |
| WO | WO 2004/102571 A1 | 11/2004 |
| WO | WO 2005/106875 A1 | 11/2005 |
| WO | WO 2006/083824 A2 | 8/2006 |
| WO | WO 2006/101979 A | 9/2006 |
| WO | WO 2006/114761 A1 | 11/2006 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

U.S. Appl. No. 12/141,015, filed Jun. 17, 2008, entitled "Time-Shifted Transport of Multi-Latticed Video for Resiliency from Burst-Error Effects", Shepherd et al.

U.S. Appl. No. 12/141,017, filed Jun. 17, 2008, entitled "Methods and Systems for Processing Multi-Latticed Video Streams", Rodriguez et al.

U.S. Appl. No. 12/141,019, filed Jun. 17, 2008, entitled "Processing of Impaired and Incomplete Multi-Latticed Video Streams", Rodriguez et al.

PCT Search Report cited in International Appln No. PCT/US2009/064180 mailed Jan. 8, 2010.

PCT Written Opinion cited in Internatnional Appln No. PCT/US2009/064180 mailed Jan. 8, 2010.

PCT Search Report cited in International Appln No. PCT/US2009/047521 mailed Dec. 22, 2009.

PCT Written Opinion cited in Internatnional Appln No. PCT/US2009/047521 mailed Dec. 22, 2009.
Stuhlmuller, Klaus, et al., "Analysis of Video Transmission over Lossy Channels"; IEEE Journal on Selected Areas in Communication, vol. 18, No. 6, Jun. 2000, pp. 1012-1032.
U.S. Appl. No. 12/417,864, filed Apr. 3, 2009 entitled "System and Method for Authorization of Segment Boundary Notifications", Inventors: Theodore R. Grevers, Arturo A. Rodriguez, and Anthony J. Wasilewski.
U.S. Appl. No. 12/417,868, filed Apr. 3, 2009 entitled "Segment Boundary Notification to a Digital Media Receiver", Inventors: Theodore R. Grevers, Arturo A. Rodriguez, and Anthony J. Wasilewski.
U.S. Appl. No. 12/417,869, filed Apr. 3, 2009 entitled "System and Method for Processing Segment Boundary Notifications", Inventors: Theodore R. Grevers, Arturo A. Rodriguez, and Anthony J. Wasilewski.
U.S. Appl. No. 12/722,117, filed Mar. 11, 2010 entitled "Management of Picture Referencing in Video Streams for Plural Playback Modes", Inventors: Walton et al.
Amon et al., "File Format for Scalable Video Coding", IEEE Transactions on Circuits and Systems for Video Technology, vol. 17 No. 9, Sep. 2007, pp. 1174-1185.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Hurst et al., "MPEG Splicing Tutorial and Proposed SMPTE Standard", Proceedings of the SMPTE Technical Conference, Nov. 1997, pp. 105-117.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I PDF E.pdf, XP007905991, pp. 1-76.
ITU-T Telecommunication Standardization Sector of ITU, Infrastrcture of Audiovisual Services—Coding of Moving Video, "Advanced Video Coding for Generic Audiovisual Services", International Telecommunication Union, H.264, May 2003, XP008095420, 282 pages.
Luo et al., "On HRD conformance for splice bitstreams", JVT Meeting, Document JVT-V055r1, Filename JVT-V055r1.doc, XP-30006863, Jan. 2007, pp. 1-11.
MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11.
Rodriguez et al., "SEI message to convey suitable splice points in the bitstream", JVT Meeting, Document JVT-Z040, Filename JVT-Z040.doc, XP-30007329, Jan. 2008, pp. 1-8.

"Splice Points for MPEG-2 Transport Streams", SMPTE Journal, SMPTE Inc., vol. 107 no. Oct. 1998, XP-000793004, pp. 916-925.
Tian et al., "Sub-Sequence Video Coding for Improved Temporal Scalability", presented at the *IEEE International Symposium on Circuits and Systems—ISCAS*, pp. 6074-6077, 2005.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report dated May 23, 2008 cited in International Application No. PCT/US2007/083867.
Written Opinion dated May 23, 2008 cited in International Application No. PCT/US2007/083867.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
International Preliminary Report on Patentability and Written Opinion dated Feb. 2, 2010 cited in International Application No. PCT/US2008/071111.
International Search Report and Written Opinion dated Apr. 15, 2010 cited in International Application No. PCT/US2010/024927.
Canadian Office Action dated Dec. 11, 2009 in Application No. 2,533,169.
European Examination dated May 4, 2010 in Application No. 07 844 937.8.
European Examination dated Sep. 16, 2010 in Application No. 08 796 875.6.
U.S. Non-final Office Action in U.S. Appl. No. 10/623,683 dated Dec. 28, 2007.
U.S. Final Office Action in U.S. Appl. No. 10/623,683 dated Jul. 25, 2008.
U.S. Non-Final Office Action in U.S. Appl. No. 11/627,452 dated Nov. 10, 2010.
U.S. Non-Final Office Action in U.S. Appl. No. 11/831,916 dated Feb. 1, 2010.
U.S. Non-Final Office Action in U.S. Appl. No. 11/831,916 dated Aug. 4, 2010.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.

* cited by examiner

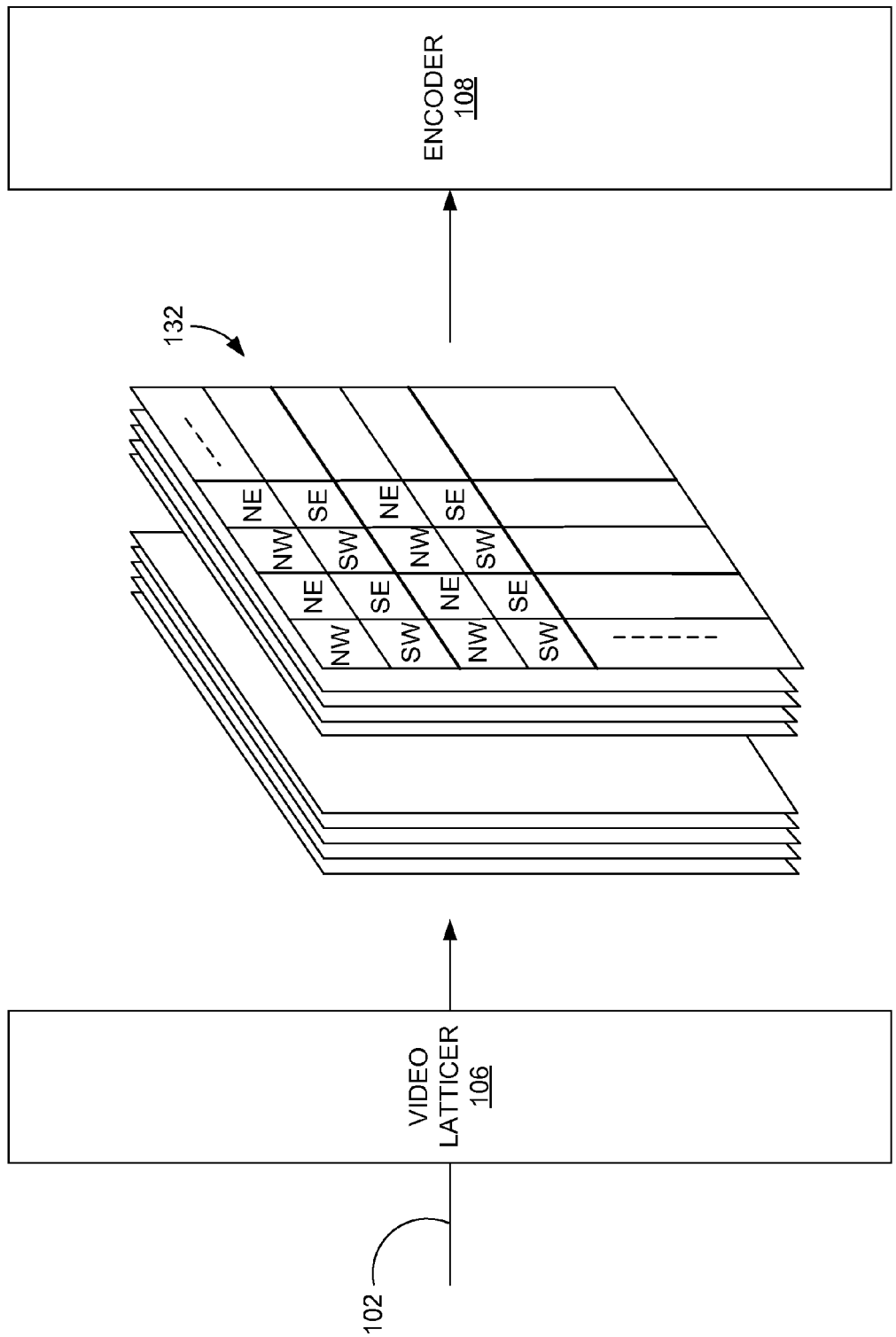

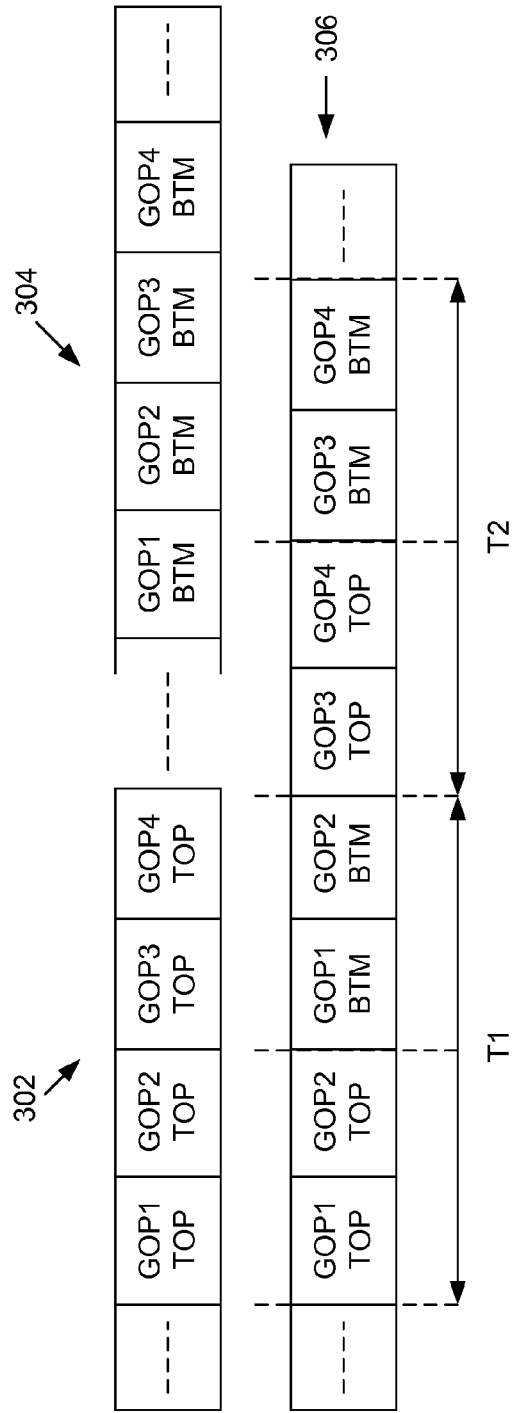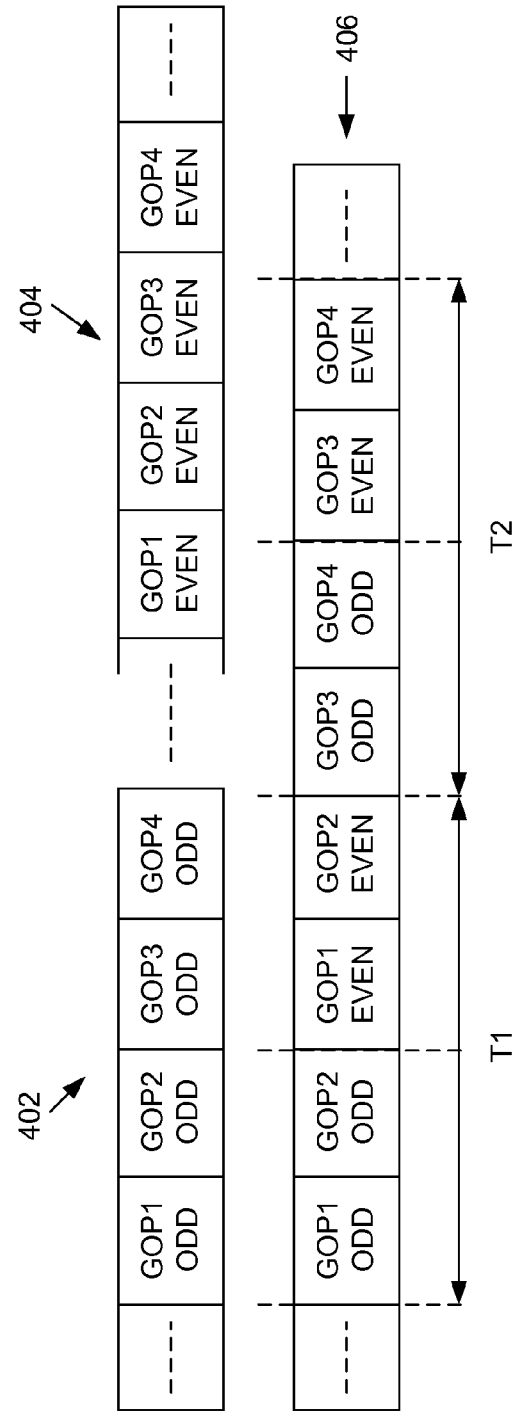

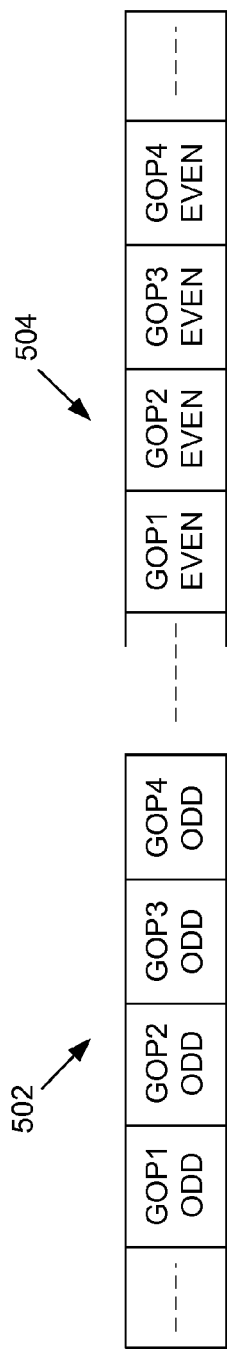
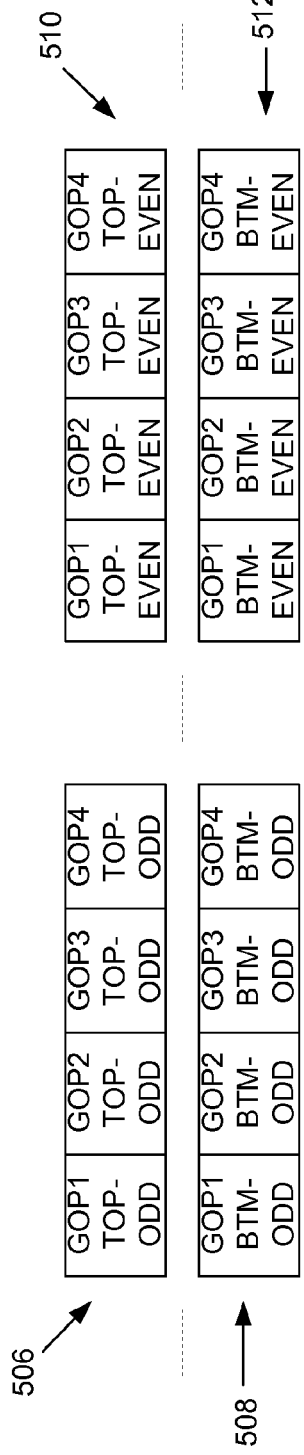
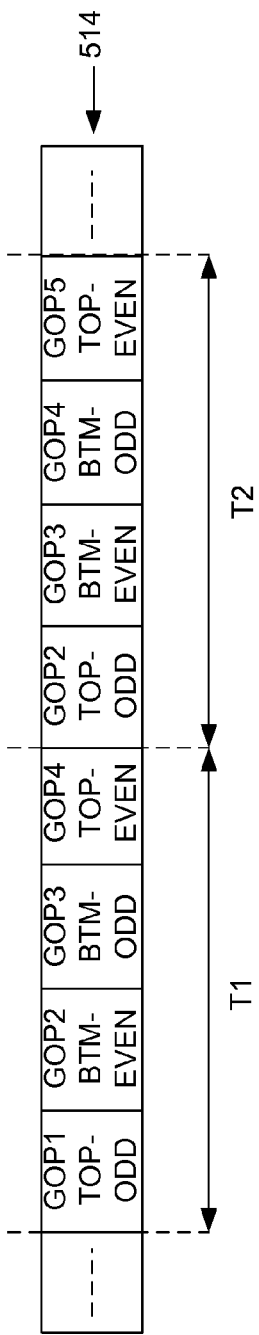

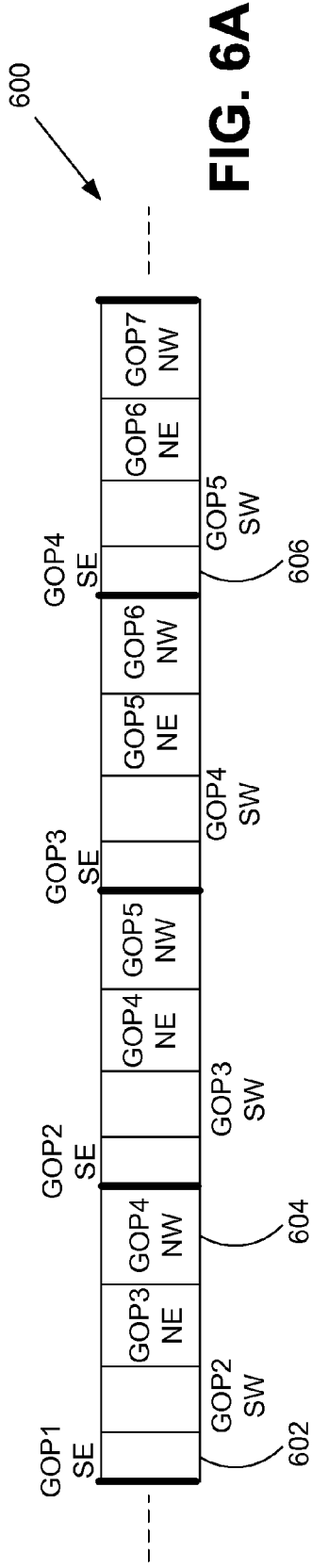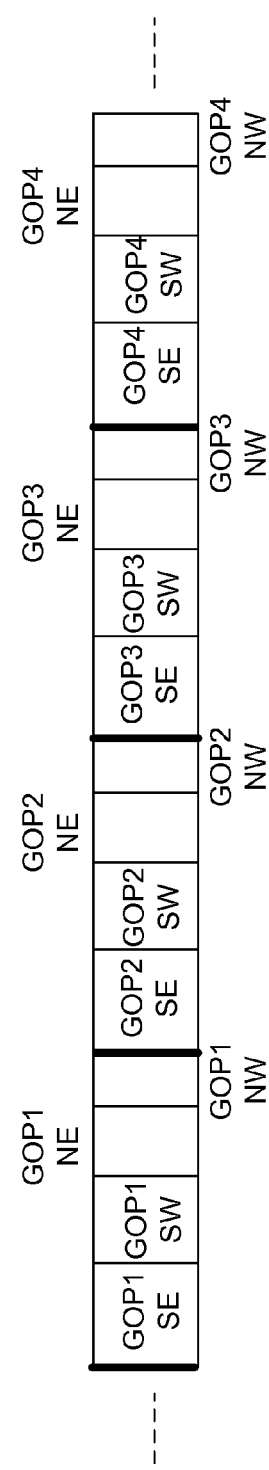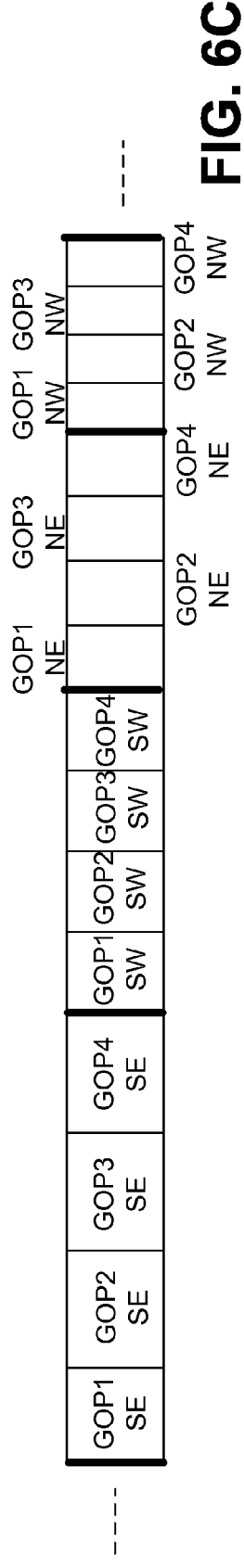

DYNAMIC STREAMING WITH LATTICED REPRESENTATIONS OF VIDEO

CROSS-REFERENCE TO RELATED APPLICATION

This application claims the benefit of U.S. Provisional Application No. 61/218,319, filed on Jun. 18, 2009, and incorporated herein by reference in its entirety.

TECHNICAL FIELD

The present disclosure relates generally to transmitting, receiving, and/or processing video content.

BACKGROUND

Transfer of a video stream over digital networks includes several aspects, such as video compression and its transmission for various types of communications networks and systems. Some applications require content to adapt to channel bandwidth through the progression of time. Particularly important in such applications is the ability to dynamically adapt to the bit-rate of media content in response to changing network conditions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1B is a block diagram that illustrates an example method of partitioning input pictures into lattice representations.

FIGS. 3A-3B are block diagrams that illustrate one example of spatial ordering and outputting among transmission intervals of groups of pictures or segments.

FIGS. 4A-4B are block diagrams that illustrate one example of temporal ordering and outputting among transmission intervals of groups of pictures or segments.

FIGS. 5A-5D are block diagrams that illustrate one example of spatial and temporal ordering and outputting among transmission intervals of groups of pictures or segments.

FIG. 6A is a block diagram that illustrates the progressively decreasing size of dependent lattice representations from a first to last transmission occurring across plural consecutive transmission intervals for a given segment.

FIGS. 6B-6D are block diagrams that illustrate different GOP ordering/encoding alternatives.

DESCRIPTION OF EXAMPLE EMBODIMENTS

Overview

In one embodiment, a method that partitions a first sequence of pictures into plural representations, encodes each of the plural representations independently of each other with a common time base, provides a first portion of the plural encoded representations based on a first network condition, the first portion having a first bit-rate, and provides a second portion of the plural encoded representations having a second bit-rate different than the first bit-rate, wherein a switch from providing the first portion to providing the second portion is responsive to a second network condition different than the first network condition.

EXAMPLE EMBODIMENTS

Disclosed herein are certain embodiments of lattice video coding (LVC) systems and methods (collectively referred to herein also as LVC systems) that provide for adaptive streaming and/or burst error immunity in a video distribution network, such as the Internet or other communication networks. In general, as and explained further below, such LVC systems decompose or partition pictures of one or more segments (e.g., groups of pictures or GOPs) of a video stream into N lattice representations (also referred to herein as latticed representations, latticed or latticed video representations, representations, or the like), where each lattice representation comprises a subset of the pixels of the pre-partitioned picture, and where the collective lattice representations of a given picture comprises the same number of pixels as the pre-partitioned picture. Each resulting lattice representation corresponds to an independently decodable stream (or in some embodiments, dependently decodable streams) that is transmitted in such a manner as to enable dispersion of the corresponding data, hence resulting in temporal data elasticity and immunity to burst errors. Further, with regard to adaptive streaming, the decomposition of the original video into independently decodable streams of lattice representations enables fine-tuning of the bit rate without the necessity of signaling between a receiver and server while obviating the need for additional encoding hardware as is common in multi-bit rate stream implementations.

These advantages and/or features, among others, are described hereinafter in the context of an example subscriber television network environment, with the understanding that other video environments may also benefit from certain embodiments of the LVC systems and methods and hence are contemplated to be within the scope of the disclosure. It should be understood by one having ordinary skill in the art that, though specifics for one or more embodiments are disclosed herein, such specifics as described are not necessarily part of every embodiment.

Figure 1A:
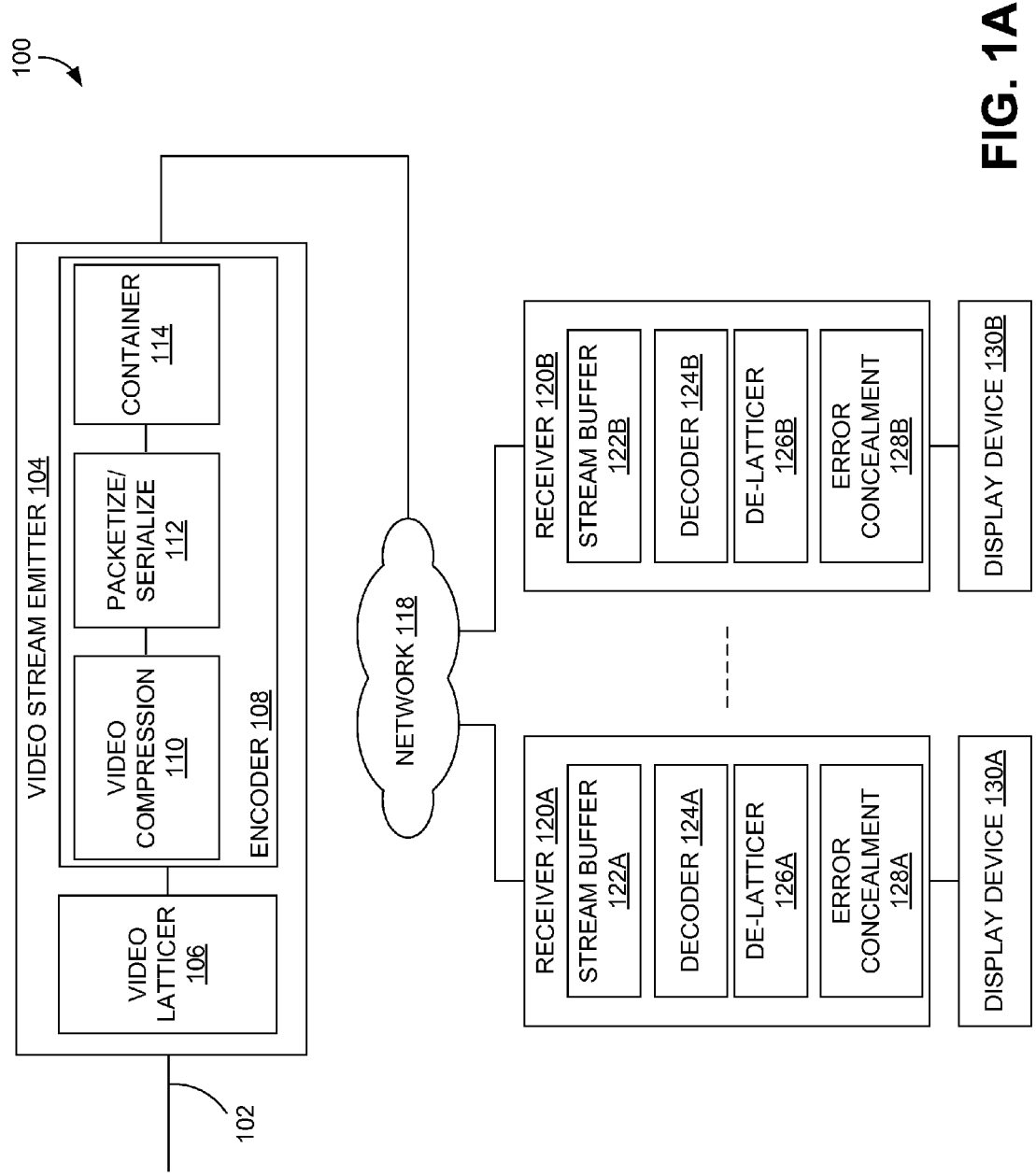
FIG. 1A is a block diagram of an example environment in which latticed video coding (LVC) systems and methods may be employed.

FIG. 1A is a block diagram of an example environment, a subscriber television system or network 100, in which certain embodiments of LVC systems and/or methods may be implemented. It should be understood by one having ordinary skill in the art, in the context of the present disclosure, that the subscriber television network 100 shown in FIG. 1A is merely illustrative, and should not be construed as implying any limitations upon the scope of the disclosure. The subscriber television network 100 includes a video stream emitter (VSE) 104 (also referred to as a transmitter) coupled over a network 118 to plural receivers 120A, 120B. The VSE 104 comprises a video latticer 106 coupled to an encoder 108. The encoder 108 comprises video compression logic 110, packetize/serialize (P/S) logic 112, and a container 114. The receivers 120A, 120B respectively comprise a stream buffer 122A, 122B, decoder 124A, 124B, de-latticer 126A, 126B, and error concealment logic 128A, 128B. The decoders 124A and 124B may be embodied in software and/or hardware configured media, such as a media player or a circuit device, respectively. Each of the receivers 120A, 120B are coupled to a display device 130A, 130B, respectively. Since each of the receivers 120A, 120B are similarly configured in one embodiment, the description that follows focuses on one of the receivers 120A, with the understanding that similar description applies to receiver 120B. Note that the receiver, video stream emitter, server, gateway, etc. may also be referred to herein as a network device.

The VSE 104 may reside in a headend, hub, node, or other network location. The VSE 104 may be coupled in one embodiment to one or more servers (not shown), or in some embodiments, may be integrated into one or more servers or other devices. In general, the VSE 104 comprises an apparatus for processing and transmitting visual information. Visual information may be any information from an information source such as from a camera, scanned from film, or synthetically created to form an image or portion thereof. The terms "visual information" and "image data" are employed interchangeably herein. In one embodiment, the VSE 104 includes a mechanism for mapping plural matrices onto each successive picture of the input video signal 102.

The VSE 104 (one is shown, though in some embodiments, plural VSEs may be employed) delivers various digital services based on an input signal 102 received from, for example, local feeds or storage, and/or sourced via a provider network upstream of the VSE 104 and processed at the facility where the VSE resides. The VSE 104 delivers such services to one or more subscribers associated with the receiver 120A, where such services may include broadcast television programming, video-on-demand (VoD), pay-per-view, music, Internet access, e-commerce (e.g., online shopping), voice-over-IP (VoIP), and/or other telephone or data services. Note that the particular arrangement of components of the VSE 104 may be re-ordered in some embodiments, and no particular order of functionality is intended to be implied for all embodiments by the configuration shown in FIG. 1A. In addition, functionality of one or more components of the VSE 104 may be combined in some embodiments in a single component, or in some embodiments, distributed among two or more of these or other components residing within and/or outside of the VSE 104. The VSE 104 may include various components not shown in FIG. 1A, including, for instance, a forward error correction (FEC) module or logic. Note that module and logic is used interchangeably herein to refer to hardware and/or software configured (encoded) mediums. In one embodiment, the VSE 104 includes filtering capabilities. Such filtering capabilities may include linear, non-linear, or anti-aliasing filtering capabilities.

The video latticer 106 receives the input (e.g., video) signal 102. In one embodiment, the input video signal 102 is a digitized and uncompressed video signal that is ingested as a sequence of successive pictures in their temporal display or output order and in accordance with a digital video or video interface specification. The digital video or video interface specification may specify use of a pixel clock, a picture format, a number of pictures per second, a pixel format, and/or the scan or serial order of the pixels of the successive pictures, or other attributes and values. The scan format of the input video may correspond to a progressive or interlaced video signal. The resulting ingested video signal includes or represents video data. The exact picture format, number of pictures per second, pixel format, and scan format of the received video data may be application specific. Different types of video formats may be used for different applications.

The video latticer 106 may be any hardware and/or software device, collection of devices, or other entity that is adapted to subsample, identify, separate, or mark different lattices of a video signal. The video latticer 106 includes circuitry and instructions, which may include one or more software and/or hardware routines for selectively latticing the successive pictures of the input video signal, thereby separating them into different latticed pictures or picture sequences. In the specific embodiment of FIG. 1A, the video latticer 106 samples each input picture to obtain smaller latticed pictures. The latticed pictures include pixel information from particular sampling regions, which represent sets of predetermined spatial locations of pixels, where the pixels are selected from matrices of each input picture.

For instance, and referring to FIG. 1B, shown is an illustration of an example latticing mechanism employed by the video latticer 106 and its output to the encoder 108. In this illustration, each picture 132 of the input video signal 102 is received by the video latticer 106, and subsampled or logically partitioned by mapping non-overlapping contiguous 2×2 sampling matrices on the picture 202, where each pixel from each 2×2 sampling matrix (or herein, matrix) is assigned to a respective partition, e.g., lattice. For example a first group of pixels in the top-left matrix includes pixels 00, 01, 10, and 11 (pixels not shown) corresponding respectively to the areas identified in FIG. 1B as NW, NE, SW, and SE. In other words, northwest (NW) pixels (e.g., pixel 00) comprise a first lattice, V0, and all of the NW pixels are assigned to a first latticed picture, LP0. All northeast (NE) pixels (e.g., pixel 01) comprise a second lattice, V1, and all NE pixels are assigned to a second latticed picture, LP1. All southwest (SW) pixels (e.g., pixel 10) comprise a third lattice, V2, and all SW pixels are assigned to a third latticed picture, LP2. All southeast (SE) pixels (e.g., pixel 11) comprise a fourth lattice, V3, and all SE pixels are assigned to a fourth latticed picture, LP3. Note that the different lattices may be referred to also herein as SE, SW, NE, NW lattices and correspond to respective latticed video representations, SE, SW, NE, NW, which can be individually segmented into segments of groups of pictures (GOPs) for processing or in alternate embodiments, separately processed and segmented into GOPs, as explained further below.

Hence, the lattice V0 is assigned every other pixel on every other row and every other column starting with pixel 00, e.g., V0 is assigned pixels mn, where m and n correspond to the row number and column number, respectively, and are even integers. For V1, m is an even integer and n is an odd integer. For V2, m is an odd integer and n is an even integer. Similarly, for V3, m and n are odd integers. When referring to sequence of pictures of the input video signal, lattices V0-V3 can be applied to the successive pictures to obtain four latticed video representations that can be processed separately and independently from each other.

Stated differently, a latticed picture (e.g., a subsampled picture) respectively corresponds to the picture that it originated from in the input video signal 102. The input video signal has a horizontal picture resolution and vertical picture resolution, ip_H and ip_V, respectively, and a total number of pixels, ip_NP, which is equal to ip_H multiplied by ip_V. Every picture in an LVR has a horizontal picture resolution and a vertical picture resolution, lp_H and lp_V, respectively, such that lp_H<ip_H and lp_V<ip_V. The number of pixels in the LVR, lp_NP, equals lp_H multiplied by lp_V.

In some embodiments, each successive picture of the input video signal 102 is separated into p (e.g., four) different lattices output by the video latticer 106. The pixels selected for each of the p latticed pictures are dispersed across a picture in accordance with the mapping of the non-overlapping contiguous n-pixels matrices on the picture. For example, in one operational mode where the number (n) of pixels in each matrix is four (n=4) and the number (p) of lattice representations formed from the input video signal 102 is four (p=4), an input picture with a picture resolution of 640 pixels in the horizontal and 480 pixels in the vertical is mapped with a 320×240 grid of 2×2 matrices, and thus, the picture is divided into different groups (matrices) of four pixels. Each 2×2 matrix contains four "adjacent" or neighboring pixels per the meaning of adjacency described below. Each pixel in a 2×2 matrix is allocated to one of the four lattices, which are each conveyed via one of the four lattice representations. Note that a picture may be mapped with matrices of different sizes and shapes other than 2×2 pixel matrices without departing from the scope of the present teachings.

A pixel is said to be spatially adjacent, or adjacent, to another pixel if they are positioned directly next to each other, either horizontally or vertically. In an alternate embodiment, pixels may be also considered adjacent if diagonally next to each other. For example, two pixels may be considered adjacent if at least one corner of a first pixel is adjacent to at least one corner of a second pixel.

Each matrix in the mapped two-dimensional grid of non-overlapping contiguous matrices on an input picture corresponds to a sampling region, where the sampling region represents the locations of the pixels of the matrix. The shape of a sampling region corresponding to a mapped matrix may be square, rectangular, linear, or polygonal. In the present embodiment, the sampling regions have horizontal and vertical edges as defined relative to edges of a picture.

Two adjacent mapped matrices separate adjacent pixels located across their horizontal or vertical edges. In one embodiment, each mapped matrix in a picture is adjacent to at least one other mapped matrix. Alternatively, each mapped matrix in a picture is adjacent to at least two other different mapped matrices. Alternatively, each mapped matrix in a picture is horizontally adjacent to at least one other mapped matrix and vertically adjacent to at least one other mapped matrix. Alternatively, each mapped interior matrix in a picture is adjacent to at least four other different mapped matrices. The borders of an interior matrix do not coincide with or are not adjacent to any portion of a picture's borders.

In one embodiment, all of the mapped matrices onto a picture have the same shape and size. In an alternative embodiment, alternating mapped matrices in scan order differ in size, shape, position within a picture, shape and size, shape and position, size and position, or size, shape, and position.

In one embodiment, the mapped matrices onto a picture do not overlap. In an alternative embodiment, the mapped matrices onto a picture overlap. Hence, mapped matrices may or may not spatially overlap.

Each mapped matrix contains n pixels that are processed by the video latticer 106 to form p lattices, and, thus, p corresponding latticed pictures. In one embodiment, the number of pixels in a mapped matrix equals the number of lattices (e.g., n=p), and the latticed pictures are said to be congruent. In an alternative embodiment, p is less than n, and n/p is an integer, and the p lattices have the same picture resolution, resulting in p congruent lattice representations which are also a complete set of lattice representations. That is, the video latticer 106 may distribute (n/p) pixels from each mapped matrix into each of the p lattices.

In yet another embodiment, p is less than n, and n divided by p does not equal an integer number, and at least one of the p lattices has a picture resolution that is different from the respective picture resolution of the other corresponding latticed pictures. Thus, the resulting lattice representations are non-congruent.

Note that in certain embodiments or implementations, the video latticer 106 may include methods or execute instructions for selectively adjusting the latticing patterns or mapped matrices employed by the video latticer 106 according to one or more predetermined criteria. For example, the latticing patterns may be selected so that any data loss is more easily concealed or disguised based on one or more characteristics of human perception. For example, humans may not be able to perceive an improvised reconstruction of lost pixel data occurring along a diagonal direction of pixels in a picture or display screen as easily as they may be able to perceive lost pixel data occurring horizontally or vertically across a display screen. Accordingly, the latticing patterns may be selected to force data losses within a predetermined time interval to occur in patterns other than horizontal or vertical lines.

The choice of lattice shape, size, and placement location within a given picture, the number of lattice representations and their relationships, the length or number of processed latticed pictures in a segment, and/or the ordering and arrangement of segments in segment distribution intervals (SDIs, explained further below) effects the manner in which losses are revealed in a given picture (e.g., horizontal bands, vertical bands, diagonal band, etc.). There are a variety of different loss patterns, the discussion of which is unnecessary for an understanding of the disclosed embodiments and hence omitted herein for brevity.

Continuing, one mechanism employed by the video latticer 106 maps a picture or frame (picture and frame used interchangeably throughout the disclosure) of a video signal with a plurality of matrices or lattices (matrices and lattices used interchangeably throughout the disclosure). For the purposes of the present discussion, a matrix may be any grouping of pixels or data associated therewith. A pixel may include one or more values associated with a data point, where a data point may be a smallest displayable element or portion of a video picture. A video picture may be any collection of data used to facilitate constructing an image or representation thereof.

For instance, the video latticer 106 separates or subsamples a video signal into plural identifiable lattice representations. Such lattices or lattice representations are not to be confused with the layers of a scalable video coding method, nor are such lattice representations to be confused with three-dimensional (3D) video since representations (lattice representations) in the present disclosure are borne from one input video source, such as provided by a single camera or single camera angle. Each lattice representations in a set of plural lattice representations can be processed independently from each other. Each of these latticesis associated with, or "assigned," pixel data from a corresponding set of pixel locations, also referred to as a "sampling region," in each picture of the video signal. Each lattice representation represents pixel information from a respective latticed version of the input video signal, and a respective latticed picture is included within a corresponding lattice representation. Each set of sampled pixel locations providing a distinct latticed picture is said to form a lattice of pixels. The respective latticed pictures originating from the successive pictures of the input video signal constitute the corresponding lattice representations of the input video signal.

The input video signal 102 to the VSE 104 may include a sequence of digitized uncompressed pictures, including video pictures that are mapped, via the video latticer 106, with non-overlapping contiguous matrices containing n pixels each. For an embodiment in which p=n=4, each pixel of each mapped matrix is strategically assigned to a different one of the four parallel lattice representations output by the video latticer 106 and then processed by the encoder 108, the corresponding compressed segments further processed by the P/S logic 112. Values of each distributed pixel to a lattice may be altered from the corresponding pixel values of the input video signal by filtering capabilities in video latticer 106.

In an alternative embodiment, a given one of the p lattice representations output by the video latticer 106 may include plural lattices. In this case, successive pictures of the input video signal are latticed by allocating unequal number of samples of the sampling matrix to obtain non-congruent corresponding latticed pictures.

In one embodiment where p=n=4 and where each picture is mapped with a two-dimensional grid of non-overlapping contiguous 2×2 matrices, a first latticed video representation of the four latticed video representations output by the video latticer 106 includes one or more pixels located in upper left portion(s) (northwest, NW) of the set(s) of pixel locations corresponding to one or more mapped 2×2 matrices. A second latticed video representation includes one or more pixels located in upper right portion(s) (northeast, NE) of the set(s) of pixel locations corresponding to the mapped 2×2 matrices. A third latticed video representation includes one or more pixels located in lower left portion(s) (southwest, SW) of the set(s) of pixel locations corresponding to the mapped 2×2 matrices. A fourth latticed video representation includes one or more pixels located in lower right portion(s) (southeast, SE) of the set(s) of pixel locations corresponding to mapped 2×2 matrices. The particular mapping of 2×2 matrices are selectively repeated across each successive picture of the input video signal so that each of the four latticed video representations include a different set of pixels chosen from every other pixel on every other line of each video picture of the input video signal.

Note that more or fewer than four pixels and four different lattices may be employed without departing from the scope of the present teachings. For example, the video latticer 106 may lattice the input video signal into two (instead of four) latticed video representations (described below), which in one embodiment are output in parallel to the encoder 108.

The video latticer 106 provides auxiliary information identifying the arrangement and order of non-corresponding segments in the successive SDIs of the video stream and of the corresponding segments over p successive SDIs of the video stream. The auxiliary information enables the receiver 120A to reconstruct the intended output pictures at their proper output time with information contributed from the decompressed version of one more corresponding latticed pictures of the received segments in the video stream. The identification of different lattices via auxiliary information may be implemented via various mechanisms, such as by insertion of specific identifying packets; by selectively adding or altering packet headers at the transport stream level, the packetized elementary stream level, the coded video layer; or by other mechanisms. Alternatively, identification information is provided in data fields in a transport stream's packet header or outside a packet payload. In another embodiment, the identification information is provided in data fields in a packetized elementary stream's packet header or outside the packet payload, wherein the packetized elementary stream is carried in the payloads of transport stream packets. In yet another embodiment, the identification information is provided in data fields in a packet header or outside a packet payload of a coded video layer.

Those skilled in the art, in the context of the present disclosure, with access to the present teachings may readily implement video latticing and de-latticing to meet the needs of a given implementation without departing from the scope of the present teachings.

The video latticer 106 may include instructions for separating an input video signal into plural latticed video representations, where each latticed video representation corresponds to one or more lattices derived from one or more corresponding sampling regions of the input video signal.

Lattice representations output by the video latticer 106 are provided to the encoder 108. In one embodiment, the p separated lattice representations are provided to the encoder 108 in parallel (e.g., at the same time) to produce respective processed (e.g., encoded) lattice representations. The video compression logic 110 of the encoder 108 compresses the lattice representations, hence converting them into respective processed lattice representations having compressed segments, each corresponding to a predetermined picture output span or a predetermined number of consecutive compressed latticed pictures in transmission order. For instance, in one embodiment, each segment corresponding to a respective lattice representation corresponds to a GOP. For purposes of the present discussion, a first of two corresponding segments (e.g., GOPs) is said to be time shifted relative to the second segment (e.g., a GOP) corresponding to the second of the two corresponding segments when a predetermined number of non-corresponding segments are inserted between them in the video stream. Thus, corresponding segments of lattice representations are time shifted relative to each other to, for instance, facilitate error concealment in a received video stream in the event of a loss of video data for a predetermined data-loss interval.

In one embodiment, the processed lattice representations are provided to the P/S logic 112 for processing (e.g., arrangement) of the segments for output. One implementation involves processing different segments containing one or more of the latticed pictures of one or more representations of the video signal (latticed or lattice representations), in time-shifted intervals for the purpose of orchestrating the order of how segments of processed latticed pictures are included in a single video stream. Segments are provided in successive segments-distribution intervals (SDIs) of the video stream according to a determined order. Each successive SDI contains plural non-overlapping segments.

Each latticed picture is obtained by selecting a corresponding pixel from each sampling matrix superimposed on the successive pictures of the input video signal or in an alternate embodiment, by obtaining a representative pixel value by processing or filtering information of the picture based on the location of the corresponding pixel in the sampling matrix. Each separate sequence of latticed pictures of the input video signal is a respective independent representation of the video signal or a lattice representation.

The order and organization arrangement of segments in the video stream may be chosen based on the size of the respective segments (e.g., number of bits for plural compressed latticed pictures in a segment) or the number of processed latticed pictures in each segment (e.g., the length of each segment), which in turn may be based on the error characteristics of a transmission channel or network, such as the types and durations of burst errors to which the transmission medium is prone. For instance, segment arrangement and ordering may be according to the size or amount of time of a transmission channel's predetermined data-loss interval, which can be expressed as a range of values. For instance, the range of values may be larger than approximately 500 milliseconds and less than approximately 2 seconds, as one example implementation among others. One having ordinary skill in the art should appreciate within the context of the present disclosure that other values for the data-loss interval may be employed. A data-loss interval may be any time interval during which data in a video stream exhibits errors, is lost, corrupted, or is otherwise not available. Various mechanisms may cause data loss in a communications channel or network, including burst errors, signal fades, or other data-loss mechanisms. Alternatively, or additionally, the length of segments may be based on the desire to reduce the amount of time for a random access operation or a channel change operation, or when targeting to reduce the amount of time in these operations when experiencing an impairment or error.

Each lattice representation may be processed into a respective sequence of processed latticed pictures, such as a sequence of compressed latticed pictures, herein also referred to as a processed lattice representation. Prior to processing and/or compression, each lattice representation may be segmented into sequential non-overlapping segments of latticed pictures. Alternatively, each lattice representation may be processed and thereafter each processed lattice representation may be segmented into segments of processed latticed pictures. In respective embodiments, segmentation may be effected prior to, while, or after processing a lattice representation. The arrangement and ordering of segments from multiple lattice representations or processed lattice representations into successive non-overlapping SDIs in the video stream is performed prior to transmission.

In one embodiment, each respective processed (e.g., compressed) lattice representations is segmented into non-overlapping contiguous segments of compressed latticed pictures (e.g., processed latticed pictures). Each segment includes consecutive compressed latticed pictures in a transmission order according to a video coding specification (e.g., the MPEG-2 video coding specification). Accordingly, the consecutive compressed latticed pictures in the segment are provided in non-overlapping manner in sequential transmission order. Consecutive segments of a processed lattice representation exhibit the same transmission order continuity as if the processed lattice representation had not been segmented.

Each separate sequence of latticed pictures of the input video signal is a respective independent representation of the video signal. In some embodiments, the pictures of each respective lattice representation may be processed or compressed independently from other lattice representations of the input video signal. Each processed lattice representation (e.g., each lattice representation in compressed form) may be provided in a single video stream but some, and possibly all, of its consecutive segments can be separated by one or more segments of other processed lattice representation in the video stream. In one embodiment, all consecutive segments of a first processed lattice representation are provided in a single video stream in their sequential order but separated by at least one segment of a different processed lattice representation. In another embodiment, the successive segments of the first processed lattice representation in the video stream are separated by a plurality of segments, each respectively corresponding to a different processed lattice representation. In yet another embodiment, for a complete set of lattice representations (as explained further below), the successive segments of each processed lattice representation are provided in the video stream separated by a plurality of segments, each provided separating segment respectively corresponding to one of the other processed lattice representations of the complete set of lattice representations.

Segments of one or more processed lattice representations may be received in a video stream by the receiver 120A. In one embodiment, all segments of a first processed lattice representation are received and separated by one or more segments of other processed lattice representations in the video stream. That is, consecutive segments of the first processed lattice representation are received with at least one or more segments of other processed lattice representations between them. In yet another embodiment, for a complete set of lattice representations (as defined below), the successive segments of each processed lattice representation are received in the video stream separated by a plurality of segments, each received separating segment respectively corresponding to one of the other processed lattice representations of the complete set of lattice representations. Successive segments of respective processed lattice representations may be separated and extracted at the receiver 120A and coalesced into the respective processed lattice representation to independently decode its compressed latticed pictures into decompressed form, which can then be output as a sequence of pictures in their output order.

In some embodiments one or more (and in one embodiment, all) of the pictures of the input video signal that are designated as non-reference pictures in compressed form are not latticed into plural lattice representations, whereas pictures of the input video signal designated as reference pictures are latticed into plural lattice representations. In such embodiments, each successive SDI in the video stream has a plurality of segments, or (p+nrs) segments, where p is greater than one and equals the segments containing compressed latticed pictures, and nrs is greater than or equal to one and equals the segments containing compressed non-reference pictures in the full picture resolution of the input video signal. Pictures in one or more of the segments (e.g., the p segments) in the successive non-overlapping SDIs of the video stream contain processed latticed pictures that are of smaller picture resolution than the resolution of the pictures of the input video signal, whereas the other one or more segments (e.g., the nrs segments) contain processed pictures that are non-reference pictures and have a picture resolution equal to the resolution of the pictures of the input video signal. Thus, there is a dependence on the compressed non-reference pictures in at least one of the nrs segments in an SDI on one or more compressed reference pictures, each of which is intended to have full picture resolution by the composition of the respective decompressed version of a complete set of p corresponding latticed pictures (as explained further below) in compressed form, and for which each of the p compressed latticed pictures is included in the same SDI as the respective p segments of compressed latticed pictures.

Each matrix may have a small number of pixels, n, such as, for example, where n=4, there are 4 pixels in a matrix. Note that in a specific embodiment n=p, where p represents the number of resulting lattice representations. Hence, a corresponding p number of lattice representations are formed, processed, and their segments ordered in successive non-overlapping SDIs of a video stream that is transmitted over a network or channel, as discussed more fully below.

Each segment of a processed lattice representation can include one or more consecutive processed latticed pictures. A compressed latticed picture may be any picture to which a compression algorithm or other operation has been applied to reduce the number of bits used to represent the latticed picture. Each of the consecutive processed latticed pictures in a given processed lattice representation corresponds to a respective latticed picture that originated or was derived from a picture of the input video signal.

If two or more latticed pictures originate from the same picture of the input video signal, they are corresponding latticed pictures. If any in a set of corresponding latticed pictures has a horizontal picture resolution or vertical picture resolution that is different from any of the others in the set, the corresponding latticed pictures are said to be non-congruent corresponding latticed pictures. Congruent corresponding latticed pictures have the same picture resolution. Throughout this specification, the term "corresponding latticed pictures" refers to congruent corresponding latticed pictures unless expressed otherwise (e.g., as non-congruent corresponding latticed pictures). Congruent or non-congruent processed corresponding latticed pictures are respectively congruent or non-congruent corresponding latticed pictures in compressed form.

Throughout this specification, reference to corresponding latticed pictures in the context of corresponding latticed pictures that have been compressed or processed should be understood as corresponding latticed pictures in their compressed form (or processed form). For instance, reference to any lattice representation received in a receiver should be understood to mean a received processed lattice representation. Unless otherwise specified, terminologies used for latticed pictures similarly apply to them when they become processed latticed pictures. For instance, corresponding processed latticed pictures are corresponding latticed pictures in processed form. Congruent or non-congruent processed corresponding latticed pictures may be respectively congruent or non-congruent corresponding latticed pictures in compressed form.

A complete set of corresponding latticed pictures has a collective number of pixels equal to ip_NP, and the composition of the set of corresponding latticed pictures forms a picture of resolution ip_H by ip_V without performing upscaling or pixel replication operations. A complete set of non-congruent corresponding latticed pictures is as a complete set of corresponding latticed pictures except that at least one of the corresponding latticed pictures has a picture resolution that is different from at least one of the others in the set of corresponding latticed pictures. Similar definitions apply to processed latticed pictures since they are just latticed pictures in processed form.

A set of p lattice representations of the input video signal forms a complete representation set of the input video signal if all of the following are satisfied:

1. For each picture of the input video signal there is a set of p corresponding latticed pictures;
2. Every set of p corresponding latticed pictures has a collective number of pixels equal to ip_NP; and
3. Composition of every set of p corresponding latticed pictures forms a picture of resolution ip_H by ip_V without performing upscaling or pixel replication operations.

That is, in a complete set of lattice representations, each successive picture of the input video signal is latticed into p corresponding latticed pictures and performing the counter operation of latticing on the p corresponding latticed pictures, de-latticing, results in a reconstructed picture of picture resolution ip_H by ip_V, and that is fully populated with pixels generated from the de-latticing of the p corresponding latticed pictures, without having to improvise for missing pixel values with upscaling or pixel replication operations. A complete set of non-congruent lattice representations is similar except that each successive picture of the input video signal is latticed into p non-congruent corresponding latticed pictures. Unless otherwise specified, in this specification it should be assumed that each successive picture of the input video signal is latticed into the same p lattice structures.

An independent set of processed lattice representations is one in which each of the p processed lattice representations can be independently decompressed from the other processed lattice representations in the set. A complete independent set of processed lattice representations conforms to both the complete set property and the independent set property.

A nearly-independent set of processed lattice representations is one in which each but one of the processed lattice representations in the set can be decompressed independently from the other processed lattice representations in the set. A complete nearly-independent set of processed lattice representations is a nearly-independent set of processed lattice representations with the completeness set property, thus, producing full picture resolution, ip_H by ip_V, for every picture.

A partially-independent set of processed lattice representations is one in which not all of the processed lattice representations in the set can be decompressed independently from the other processed lattice representations in the set, but at least two of the processed lattice representations in the set can be decompressed independently.

A complete set of p processed lattice representations is said to have R independently decodable processed lattice representations if for R<p, each of (p−R) processed lattice representations in the set depends on the information of at least one or more of the other (p−1) processed lattice representations for its decompression.

For purposes of illustrating a particular embodiment, let picture (k, v) represent the k-th compressed picture in transmission order of a given processed lattice representation, v. For nf (number of pictures) equal to a positive integer, a segment of nf consecutive compressed pictures of a first processed lattice representation is said to correspond to a segment of nf consecutive compressed pictures of a second processed lattice representation if for each integer value of k from 1 to nf, the respective k-th compressed pictures in transmission order are corresponding latticed pictures in compressed form. Similarly, a plurality of segments from respectively corresponding processed lattice representations are said to be corresponding segments if all possible pairing of two of the plurality of segments are corresponding segments. In some embodiments, corresponding segments must have the same number of pictures, nf, and in transmission order, for each integer value of k from 1 to nf, the kth compressed picture in each of the corresponding segments must be a corresponding picture to the respective kth compressed picture in each of the other segments. In other words, if each successive picture in segments from respective processed lattice representations originated from the same pictures of the input video signal, the segments are corresponding segments.

A complete set of corresponding segments corresponds to a complete set of processed lattice representations. The successive corresponding processed latticed pictures (in transmission order) in a complete set of corresponding segments are a complete set of corresponding latticed pictures.

Corresponding segments or the segments in a complete set of corresponding segments may be separated from each other in a video stream so that a data loss during a given time interval does not corrupt all of the processed latticed pictures associated with and originating from the same picture of the input video signal. Consequently, missing or corrupted portions of a compressed latticed picture may be concealed via various mechanisms, including linear or nonlinear interpolation or picture upscaling, at the receiver. Hence, this embodiment combines error correction and error concealment to facilitate resilient robust transport of video over a lossy channel or network, such as an Internet Protocol (IP) packet-switched network. Certain embodiments discussed herein may be particularly useful in applications involving broadcasting video via packet-switched networks, also called over-the-top video transmission.

The respective segments of processed lattice representations are carried in a video stream in a determined order and/or organization arrangement in accordance to one or more objectives. In some embodiments, the determined order and/or organization arrangement of sequentially ordered segments is intended for error resiliency purposes. In some embodiments, the ordering and/or organization arrangement of the segments is according to the error characteristics of the transmission channel and/or network. In some embodiments, the determined order and/or organization arrangement of sequentially ordered segments is intended to facilitate rapid random access or fast channel change time. In yet other embodiments, the determined order and/or organization arrangement of sequentially ordered segments is for both error resiliency reasons and fast channel change time (or as random access of the video program).

A segments-distribution interval (SDI) in a video stream is an interval that satisfies all of the following:
1. Contains a plurality of sequentially ordered non-overlapping segments corresponding to processed video representations of the input video signal;
2. Contains not more than one picture that originated from the same picture of the input video signal;
3. Every possible pairing of two consecutive segments in the SDI corresponds to two different processed video representations of the input video signal;
4. The picture output span of the SDI, which is the temporal span in output order of all the pictures in the SDI, referred to herein as the SDI output span, divided by the number of different processed video representations of the input video signal in the SDI equals an integer;
5. The SDI output span corresponds to a time-contiguous picture output span, and over the SDI output span each of the pictures in the SDI is intended to be output in its decompressed form (or as information derived from its decompressed form) at most once, except for when a corresponding "picture output command or information" received in the SDI conveys to repeat a field of the respective output picture or the respective output picture to fulfill the intended contiguous output of pictures.

Steps 4 and 5 assume the intended content of the SDI without impairments. Step 2 expresses that each of the processed pictures of the segments in an SDI originates from a different picture of the input video signal. That is, each compressed picture in the SDI respectively corresponds to a picture of the input video signal. As expressed in Step 1, the sequentially ordered segments in an SDI are non-overlapping. In other words, the first portion of information of each successive segment in the SDI is not provided in the video stream until the information of the prior segment is completely provided.

As is well-known in the art, pictures in encoded video streams may be provided (e.g., transmitted) in a transmission order or decode order that differs from their output order (e.g., display order).

A latticed video SDI (LVSDI) is an SDI in which all pictures in the SDI are processed latticed pictures. In other words, an LVSDI in a video stream is an interval that satisfies all of the following:
1. Contains a plurality of sequentially ordered non-overlapping segments corresponding to processed lattice representations of the input video signal;
2. Contains no corresponding processed latticed pictures;
3. Every possible pairing of two consecutive segments in the SDI corresponds to two different processed lattice representations;
4. The LVSDI output span divided by the number of different processed lattice representations in the LVSDI equals an integer;
5. The LVSDI output span corresponds to a time-contiguous picture output span, and over the LVSDI output span each of the latticed pictures in the LVSDI is intended to be output in its decompressed form (or as information derived from its decompressed form) at most once, except for when a corresponding "picture output command or information" received in the LVSDI conveys to repeat a field of the respective output picture or the respective output picture to fulfill the intended contiguous output of pictures.

Again, Steps 4 and 5 assume the intended content of the LVSDI without impairments. Step 2 expresses that each of the processed latticed pictures of the segments in an LVSDI originates from a different picture of the input video signal.

A congruent LVSDI is an LVSDI in which all the pictures in the SDI are processed latticed pictures and have the same picture resolution. A non-congruent LVSDI contains at least one processed latticed picture with picture resolution that is different from any of the other processed latticed pictures in the LVSDI. Throughout this specification, LVSDI refers to a congruent LVSDI unless expressed otherwise (e.g., as a non-congruent LVSDI).

A completely-represented LVSDI (CRLVSDI) is an LVSDI that contains at least one segment from each respective processed lattice representation of a complete set of p processed lattice representations. Recall that the segments in an LVSDI are non-corresponding segments by definition.

The minimum set of successive CRLVSDIs, MinC, is the minimum number of contiguous CRLVSDIs in the video stream to provide the complete corresponding segments for each segment in each CRLVSDI.

In one embodiment, the segments of plural processed lattice representations are provided (or received) in a video stream according to a first temporal order that specifies a temporal relationship between one or more segments, and possibly all of the segments, included in each successive SDI in the video stream. In one embodiment, the SDIs are a complete set of p congruent processed lattice representations and the first temporal order specifies the order of the p non-corresponding segments in each successive LVSDI, which in this case is a CRLVSDI. A second temporal order may further specify the order of each set of p corresponding segments over each set of p successive CRLVSDIs in the video stream (i.e., MinC=p).

The encoder 108 outputs the successive compressed latticed pictures corresponding to each of the p lattice representations in accordance with the syntax and semantics of a video coding specification. In one embodiment, segments are provided sequentially, where each segment consists of plural compressed pictures from the same lattice representation. The transmission order of the successive compressed latticed pictures in a processed lattice representation may or may not equal the display or output order of the pictures. For example, in certain applications, a future reference picture may be required to be transmitted prior to a picture having an earlier display or output time, but that depends on the decoded version of that future reference picture for its reconstruction. The encoder 108 effects compression of the p lattice representations such that, in one embodiment, the relative transmission order of the successive compressed latticed pictures in each of the corresponding p processed lattice representations is the same. However, in the present embodiment, although the relative transmission order of the processed latticed pictures within each of the p processed lattice representations is the same, as explained below, each set of p corresponding segments is transmitted in accordance with a second relative temporal order, which is a re-ordered and/or time-shifted version of the order of contiguous segments.

The compressed segments are provided to the P/S logic 112, which arranges and orders the segments in a non-overlapping manner over a set of p successive non-overlapping SDIs of the video stream. In one embodiment, the P/S logic 112 imposes a time shift and ordering of the respective segments of processed lattice representations. Note that a first latticed picture is said to correspond to a second latticed picture if they both originated from the same picture of the input video signal. Further, corresponding latticed pictures are temporally aligned to the same instance or interval of time for display or output purposes since they originated from the same picture. Depending on the embodiment, the sequentializing (including ordering and/or time-shifting) of latticed pictures or video segments may occur before, during, or after their compression. The P/S logic 112 may be any hardware and/or software device, collection of devices, or other entity that is adapted to sequentialize (order/arrange and/or time-shift) consecutive segments of each of p plural processed lattice representations in non-overlapping manner within each successive SDI of the video stream and arrange them across successive SDIs as previously described. The P/S logic 112, in sequentializing the segments, may indirectly impose a time shift effect, whereby one or more of the plural segments of the different processed lattice representations are shifted in time (or otherwise) with respect to one or more other segments in the video stream.

The arrangement and ordering of the segments comprises of ordering p non-corresponding segments consecutively (and in a non-overlapping manner) in each of the p successive non-overlapping SDIs, and by separating each set of p corresponding segments into the respective set of p successive non-overlapping SDIs. The separation imposes a time delay among corresponding segments in the video stream due to the fact that they are interspersed by non-corresponding segments. The arrangement and ordering operation of p multiplied by p segments (e.g., 16 segments when p=4) in P/S logic 112 is further according to satisfying all of the following:

(1) Arranging the p non-corresponding segments in each of the p successive non-overlapping SDIs in a time-continuous order, such that there is picture output continuity from the last picture output from a non-corresponding segment in the SDI to the first picture output from the successive non-corresponding segment in the SDI;

(2) Arranging p non-corresponding segments as the first segment in each of the p successive non-overlapping SDIs in time-continuous order, such that there is picture output continuity from the last picture output from the first segment in an SDI to the first picture output from the first segment in the successive SDI, and all of the p first segments of the p successive non-overlapping SDIs are from the same processed lattice representation.

In addition to the above two arrangement and ordering criteria, in one embodiment, all possible pairings of two consecutive segments provided in the video stream are non-corresponding segments.

An example method for latticing, encoding, and arranging the encoded (processed) lattice representations includes receiving an input video signal with one or more successive uncompressed pictures; separating each of the one or more successive pictures of the input video signal into a complete set of p corresponding latticed pictures; compressing the successive latticed pictures of each lattice representation of the resulting complete set of lattice representations to obtain a complete set of processed lattice representations, then segmenting the complete set of processed lattice representations into contiguous non-overlapping corresponding segments, and then ordering and/or arranging each successive set of p corresponding segments in each successive non-overlapping set of p consecutive non-overlapping SDIs in the video stream according to a first temporal order.

In an alternate embodiment, rather than employing the first temporal order, p non-corresponding segments respectively corresponding to each of the plural processed lattice representations are arranged in each successive SDI in the video stream in accordance with the definition of CRLVSDI (described above), and further in accordance with maintaining continuity in picture from each segment in the SDI to the next non-overlapping segment in the SDI. That is, the segments are ordered within the SDI such that the first picture output from each succeeding segment in the SDI has a presentation time, or PTS, (e.g., as specified in MPEG-2 Transport) immediately after the presentation time (e.g., output time) of the last picture output from the prior segment in the SDI. The aforementioned ordering of consecutive segments of each of the p processed lattice representations are strategically ordered over consecutive SDIs but because each SDI contains multiple segments, and each of the segments do not overlap in the SDI, and consecutive SDIs do not overlap, consecutive segments of the same processed lattice representation are separated by segments of other processed lattice representations in the video stream. Furthermore, according to the definition of SDI, corresponding segments are also separated by segments of other processed lattice representations. Thus, segment ordering in the video stream is performed before transmission aiming to facilitate error correction and/or error concealment.

Another mechanism sequences (e.g., including ordering) corresponding segments of plural processed lattice representations of at least a portion of a video program, the sequencing representing a non-multiplexed ordering of segments of plural processed lattice representations borne from a video program. These sequenced segments are provided in the disclosed embodiments in a single video stream to the receiver 120A. Such a single video stream may be referred to as a single aggregated video stream or aggregated video stream throughout this specification because it includes the aggregated segments of plural processed lattice representations.

Another mechanism employs sequencing of segments according to the proportioned bit allocation of the different picture types or of pictures of different levels of importance whereby different quantities of bits are allocated for different picture types and/or pictures (of the same or different picture types) having different relative picture importance.

The N LRs are included in the container 114 as one file, program stream, or transport stream, and provided for transmission over the network 118. Note that the encoder 104 is configured to deliver encoded (e.g., according to one or more of a plurality of different transport and video coding standards/specifications, such as AVC, MPEG-2, etc.) video.

It is noted that the segments corresponding to each of the p processed lattice representations are sequenced into contiguous non-overlapping SDIs of the video stream such that for all possible pairings of two consecutive segments provided in the video stream the start of the second of the two successive segments in the video stream is after the providing the first of the successive segments in full.

In one embodiment, the number of consecutive processed latticed pictures in each segment of each successive set of p corresponding segments is fixed. In an alternative embodiment, the number of consecutive processed latticed pictures, nf, in two consecutive video segments of a given aggregated video signal changes from a first number to a second number. The change from a first number of consecutive pictures to a second number of consecutive pictures also occurs for the corresponding segments of the other p−1 processed latticed video representations.

Note that in some embodiments, the VSE 104 may apply FEC techniques to a given video stream to be transmitted over the network 118. Application of FEC to a video stream may include the correction of lost data or other errors in a video stream using the repair symbols. Such FEC processing may involve adding redundant data in the form of repair symbols to the video stream to reduce or eliminate the need to retransmit data in the event of certain types of data loss. The repair symbols facilitate reconstructing the video stream at a receiver in the event of data loss. Data may be lost due to noise, differing IP routing convergence times, Raleigh fading in wireless networks, and so on. FEC functionality in the VSE 104 adds sufficient repair symbols to each segment output as part of the aggregated video stream by the VSE 104 to enable the receivers 120A, 120B to correct for errors or data loss to the aggregated video stream (or portions thereof) within an FEC-protection time interval, also called an FEC protect window. Generally, the FEC-protection time interval is often relatively small compared to a loss-concealment interval implemented by the error concealment logic 128 of the receivers 120A, 120B.

For clarity, various well-known components, such as video amplifiers, network cards, routers, Internet Service Providers (ISPs), Internet Protocol SECurity (IPSEC) concentrators, Media GateWays (MGWs), filters, and multiplexers or demultiplexers, and so on, have been omitted from the figures. However, those skilled in the art with access to the present teachings will know which components to implement and how to implement them to meet the needs of a given application, and hence one or more of such devices may be incorporated in some embodiments and are contemplated to be within the scope of the present disclosure.

The network 118 comprises a bi-directional network, or, in some embodiments, a one-way network, and may include a cable television network, a satellite television network, a terrestrial network, an IP network, or a combination of two or more of these networks or other networks. Further, network PVR and switched digital video are also considered within the scope of the disclosure. Generally, the network 118 may comprise a single network, or a combination of networks (e.g., local and/or wide area networks). For instance, the network 118 may comprise a wired connection or a wireless connection (e.g., satellite, wireless local area network (LAN), etc.), or a combination of both. In the case of wired implementations, communications network 118 may comprise a hybrid-fiber coaxial (HFC) medium, coaxial, optical, twisted pair, etc. Other networks are contemplated to be within the scope of the disclosure, including networks that use packets incorporated with and/or compliant to other transport protocols or standards or specifications.

As noted above, the VSE 104 is coupled to the receivers 120A and 120B via the network 118. Each receiver may comprise one of many devices or a combination of devices, such as a set-top box, television with communication capabilities, mobile devices such as cellular phone, personal digital assistant (PDA), or other computer or computer-based device or system, such as a laptop, personal computer, DVD and/or CD recorder, among others. Referring to receiver 120A (with similar applicability to receiver 120B), one embodiment of the receiver 120A comprises a stream buffer 122A that buffers a suitable length of a video program. In some embodiments, the stream buffer 122A may be omitted. The receiver 120A also comprises a decoder 124A that works in association with the stream buffer 122A, among other buffers (e.g., compressed picture buffer, decoded picture buffer) to decode the processed lattice representations. The decoded lattice representations are provided to the de-latticer 126A, which assembles the lattice representations into the reconstructed picture from which the lattice representations were derived. The de-latticer 126A is coupled to error concealment logic 128A, as explained further below. The decoder 124A may include various other functionality, including reverse-FEC functionality.

For the purposes of the present discussion, plural processed lattice representations are output from the VSE 104 as a single video stream, successively transmitted as portions of video data, such as, but not limited to, the sequential, non-overlapped compressed latticed pictures.

In one embodiment, plural separate video segments are ordered and/or time shifted in non-overlapping manner (e.g., sequenced) into a single video stream and then transmitted over a single transmission channel. Auxiliary information may be provided in or associated with the video stream to identify the segments of the respective processed lattice representations. The auxiliary information may include information indicating how decoded versions of compressed latticed pictures are to be assembled by the de-latticer 126A into the intended full picture resolution of output pictures.

Auxiliary information in, or associated with, the video stream provides identification information that conveys spatial relationships of the lattices and the relative temporal order of the segments of the processed lattice representations. For purposes of the present discussion, the relative temporal order of segments may specify the actual order of the start, end, or completion of each of the segments in successive SDIs, and/or each corresponding processed picture in the video stream and may further specify the minimum set of successive CRLVSDIs. The relative temporal order of segments or pictures is said to be relative, since they are ordered or positioned for transmission with respect to each other within SDIs or over a minimum set of successive SDIs.

The error concealment logic 128A is configured to disguise an impairment in a video stream, such as omitted data, lost data, impaired data, or data that has not yet been received by the receiver 120A, or other errors occurring in the transmission or reception of a video stream. Herein, an impairment refers to omitted data, lost data, impaired data, or data that has not yet been received by a receiver (e.g., receiver 120A, 120B, etc.), or to other errors occurring in the transmission or reception of a video stream.

The error concealment logic 128A includes filtering capabilities, such as linear, non-linear or anti-aliasing filtering capabilities to effect upscaling of a decoded latticed picture. The filtering capabilities in the error concealment logic 128A may compensate for lost data, impaired data, or non-received data. For example, filtering capabilities may be employed to upscale at least a portion of a decoded latticed picture in a first processed lattice representation to conceal an impairment in a corresponding latticed picture. For the purposes of the present discussion, data is said to be upscaled when deriving or replicating data to compensate for an impairment of data.

The filtering capabilities in the error concealment logic 128A may be employed to upscale at least a portion of a decoded version of latticed picture (k, 1), such as the SW latticed picture, that spatially-corresponds to the impaired portion of latticed picture (k, 2), such as the NE latticed picture. For instance, in reference to FIGS. 1A-1B, some or possibly all of the generated pixel values in the upscaled version of a decoded latticed picture (k, 1) are used to compensate for the corresponding pixels of at least one impaired portion of the decoded version of latticed picture (k, 2) or the whole of latticed picture (k, 2) if latticed picture (k, 2) was completely impaired or undecodable.

In one embodiment, when latticed picture (k, 2) is impaired, a single decoded non-impaired latticed picture, e.g., latticed picture (k, 1), is upscaled in error concealment logic 128A to compensate for the respective one or more spatially-corresponding impaired portions in latticed picture (k, 2). Alternatively or in addition, when latticed picture (k, 2) exhibits one or more partial-picture impairments, one or more portions of a single decoded non-impaired latticed picture, e.g., latticed picture (k, 1), are upscaled in error concealment logic 128A to compensate for the respective spatially-corresponding impaired portions in latticed picture (k, 2).

In another embodiment, p processed lattice representations and identification information are received at the receiver 120A. Filtering capabilities in error concealment logic 128A may be used to upscale the decoded versions of (p−1) non-impaired corresponding compressed latticed pictures to compensate for one or more impairments in the corresponding p-th compressed latticed picture. For purposes of the present discussion, the respective k-th compressed latticed pictures in each of p received processed lattice representations are corresponding compressed latticed pictures. The relative temporal order of the p corresponding k-th processed (e.g., compressed) latticed pictures is determined by the receiver 120A from the received identification information, e.g., auxiliary information, such as a presentation time stamp (PTS). The p corresponding k-th compressed latticed pictures may be determined by the receiver 120A from the PTS or output order information of the p corresponding compressed latticed pictures (or corresponding p segments). The corresponding p compressed latticed pictures are decoded by the decoder 124A in accordance with their relative temporal order. The spatial relationships of the decoded versions of the p corresponding k-th compressed latticed pictures are also determined by the receiver 120A from the same received identification information.

In an alternate embodiment, the spatial relationships of the decoded versions of the p corresponding k-th compressed latticed pictures are determined by the receiver 120A from additional or different auxiliary information that differs from the received identification information described above. A composite or assembled output picture of the same spatial resolution as the input video signal 102 to the VSE 104 is formed by the de-latticer 126A in accordance with the spatial relationships determined from the identification information or from the additional or different auxiliary information. One or more of the (p−1) corresponding decoded latticed pictures are individually upscaled in the error concealment logic 128 to compensate for one or more impairments in the k-th compressed latticed picture of the p-th processed lattice representation. Similarly, when two corresponding compressed latticed pictures in the received video stream exhibit impairments, one or more of the (p−2) corresponding decoded latticed pictures are individually upscaled to compensate for the impairments.

In one embodiment, the decoder 124A (or other component) includes a reverse FEC module or logic. The reverse FEC module implements instructions for repairing certain data loss or corruption occurring in one or more of the segments received from the VSE 104. The certain data loss or corruption corresponds to data losses or corruption that are within a predetermined data-loss interval, referred to herein as the FEC protect window. Existing FEC modules, methods, and techniques may be readily adapted for use with embodiments discussed herein by those skilled in the art without undue experimentation. The first reverse FEC module of the decoder 124A is further adapted to undue any modifications to the segments that were initially performed by the FEC module of a transmit chain before the segments were transmitted over the network 118. Such modifications can be implemented via altering of data, adding repair symbols, or a combination of both.

The decoder 124A may include one or more circuits, routines, or instructions (e.g., in software implementations) for decompressing the aggregated video stream provided by the VSE 104. The instructions (e.g., coded as a media player program or otherwise) may include an inverse of the process used by video-compression and sequentializing functionality implemented by the encoder 108. The decoder 124A is further configured with one or more bit buffers (not shown). In one embodiment, the decoder 124A is configured with a bit buffer (BB) dedicated to each respective processed lattice representation segment. In some embodiments, a single bit buffer partitioned for each respective segment (e.g., SE, SW, NE, and NW) may be implemented. The decoder 124A orchestrates the decoding of the buffered segments according to a defined bit buffer management policy, in some embodiments ranging in finite picture fidelity levels for the intended output pictures. The range of finite levels of picture fidelity may span from immediate, yet partial resolution decoding to full resolution decoding after a defined latency, and gradations in between, as explained further below.

Decompressed video data streams are then output by the decoder 124A and subsequently de-latticed by the de-latticer 126A. Receiver 120A includes capabilities and/or instructions for coalescing corresponding segments, processing, and for combining the decompressed corresponding latticed pictures for output in an intended picture resolution. In some embodiments, video de-latticing functionality and decoding functionality can be features found in a single module, such as in decoder 124A or other components.

Exact details of mechanisms for reconstructing successive pictures for output from sets of p decompressed corresponding latticed pictures received in the video stream in compressed form are application specific. In some embodiments, associated auxiliary information such as tags or packet headers that identify the processed lattice representations (and the relationship of the received corresponding segments and non-corresponding segments) is used by receiver 120A to properly process and reconstruct the pictures of the processed lattice representations. This identification information, which may be added by the video latticer 106 and/or encoder 108 may enable one or more of the decoder 124A or de-latticer 126A to manage the bit buffers, to recombine or coalesce the received segments, associate the received corresponding segments into each respective processed lattice representation, and associate time-continuous non-corresponding segments. The two forms of association are used to effect reconstruction of output pictures at non-decreasing picture fidelity levels.

The error concealment logic 128A includes circuitry and/or instructions for concealing any losses in the video stream that were not repaired by the reverse FEC module of the decoder 124A. Furthermore, since corresponding segments are separated by non-corresponding segments in the video streams, output picture reconstruction is controlled with successively non-decreasing or increasing fidelity levels.

The number of initial pictures, for example, after a channel is changed on a television or set-top terminal or other type of receiver 120A, that will have missing data depends on a number of factors, including the size or length of the segments in the video stream, the number of segments in each successive SDI of the video stream, the bit-rate of the video stream, and where the initial acquisition of the video stream (e.g., tuning) occurs with respect to the first span of segments belonging to the first received SDI. The output of the error concealment logic 128A may be input to another stage of video processing, to a display device 130A, to memory, or to another entity.

Various methods for concealing missing or lost information may be employed by the error concealment logic 128A. For example, in one implementation, missing pixel information is estimated via an interpolation process. The interpolation process may include performing linear or nonlinear interpolation in a direction across a video picture that exhibits the least amount of change in color brightness, and/or combination thereof. Providing missing or corrupted pixel information is a type of upsampling. Accordingly, the upsampling of missing or corrupted pixels may be performed by filling in pixels in the direction of decreasing luma and/or chroma gradients using nonlinear upsampling.

Interpolation may include determining how certain information varies spatially through one or more decompressed corresponding latticed pictures, or temporally through decompressed non-corresponding latticed pictures that have consecutive output times, then continuing to interpolate pixel information to fill missing pixels in the output picture at its intended picture resolution. Various types of interpolation are possible. Details for determining values for missing pixel information can be application specific.

Furthermore, while the error concealment logic 128 generally employs pixel information associated with a given picture to estimate lost pixel information within the picture to be output in its intended picture resolution, embodiments are not limited thereto. For example, in certain implementations, pixel information from temporally adjacent pictures may be employed to further estimate lost pixel information in a given picture.

At the receiver 120A, in one embodiment, different bit buffer management policies are implemented based on the buffer structure (e.g., separate bit buffers per respective segments of processed latticed video representations, as explained above, or in some embodiments, a single bit buffer for the segments corresponding to the collective processed lattice representations). Bit buffer management policies include reliance on the decoded time stamp (DTS), constant bit rate considerations, underflow, etc. For instance, in an embodiment utilizing a bit buffer per respective processed latticed representation, one bit buffer management policy is to allow the bit buffer to reach zero (fast drain) to enable fast channel change implementations. That is, the ¼size pictures enable a quartering of the initial buffering delay if the bit buffer is allowed to reach zero, although not the only way. In some embodiments, the VSE 104 (e.g., the encoder 108) may provide auxiliary information on buffering rules, such as allowed buffer sizes, etc.

Note that the four processed lattice representations, in one embodiment, are independently decodable. In embodiments where B pictures are relegated to a single processed lattice representation, then independent decoding among all processed lattice representations is not available.

When the segments corresponding to the processed lattice representations are received and buffered at the receiving device (e.g., receiver 120A), one of a plurality of decoding strategies may be implemented. For instance, upon tuning to a given channel that contains these segments, the segments corresponding to the SE processed lattice representations reside in the bit buffer before the segments corresponding to the other three latticed video representations, and hence should one strategy be to begin decoding immediately, the resulting displayed sequence of reconstructed pictures have ¼resolution (since only the segments corresponding to the SE processed lattice representations have been buffered). Successive intervals of delay before decoding results in increased resolution (e.g., ½ resolution if pictures from SE and SW segments are used, ¾ resolution if pictures corresponding to the SE, SW, and NE segments are used, and full resolution if decoding is delayed until all corresponding segments have been buffered). The extent to whether the gradations in resolution are discernable by a viewer depends on the interval of delay. For instance, the longer the interval, the more tolerant to loss due to errors, but the greater the start-up latency to full-resolution. Some example strategies for implementing decoding of the segments pertaining to the processed lattice representations includes the stages implied above, namely, a frozen image of ¼ resolution, full motion resolution, and full motion, full resolution, with gradations in between.

Although the receiver 120A has been described with a few components, one having ordinary skill in the art should appreciate that other components known to those having ordinary skill in the art may be included in some embodiments, such as a tuner, processor, volatile and non-volatile memory, video and graphics pipelines and other display and output processing components, among other components.

Note that various couplings between modules (e.g., logic) and groupings of modules shown in FIG. 1A are for illustrative purposes. Those skilled in the art may employ different couplings and groupings without departing from the scope of the present teachings. The exact couplings and order of various logic of FIG. 1A are application specific and may be readily changed to meet the needs of a given application by those skilled in the art without undue experimentation.

It should be understood by one having ordinary skill in the art, in the context of the present disclosure, that the subscriber television network 100 may comprise additional equipment and/or facilities, such as one or more servers, routers, and/or switches at one or more locations of the network 100 that process, deliver, and/or forward (e.g., route) various digital (and analog) services to subscribers. In some embodiments, the subscriber television network 100 (or components thereof) may further comprise additional components or facilities, such as QAM and/or QPSK modulators, routers, bridges, Internet Service Provider (ISP) facility servers, private servers, on-demand servers, multimedia messaging servers, program guide servers, gateways, multiplexers, and/or transmitters, among other equipment, components, and/or devices well-known to those having ordinary skill in the art.

In one embodiment, the components of an LVC system comprise the VSE 104, the receiver 120A (or receiver 120B), or a combination of the VSE 104 and receiver 120A (or 120B). In some embodiments, components of an LVC system comprise select components of the VSE 104 or receiver 120A (or 120B), and in some embodiments, additional components may be included within an LVC system.

Figure 2:
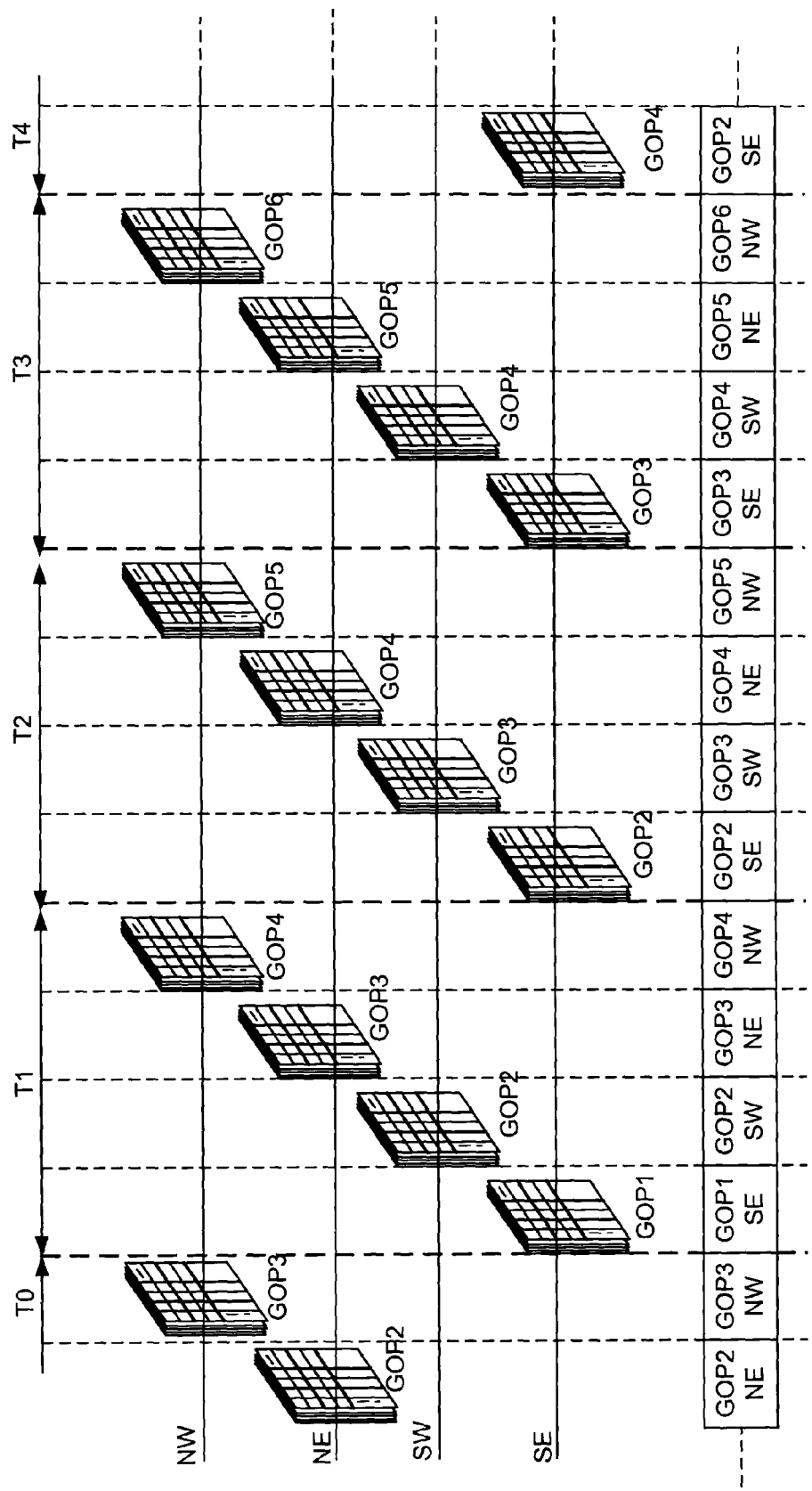
FIG. 2 is a block diagram that illustrates one example mechanism for ordering and transmitting each lattice representation in successive transmission intervals.

Referring now to FIG. 2, shown is a block diagram that illustrates one example mechanism for ordering and transmitting each lattice representation in successive transmission intervals. In one embodiment where p=4 and complete sets of congruent and independent processed lattice representations are provided in a video stream in successive CRLVSDIs, and in which successive sets of four CRLVSDIs contain sixteen (16) segments as shown in FIG. 2, start-up latency and the benefits of ordering and arrangement of the segments in the video stream (at the VSE 104) can be explained in the context of the decoding and bit-buffering strategy illustrated in FIG. 2, which illustrates the reception (tuning-in) and processing (e.g., decoding) of sixteen (16) segments of processed lattice representations, each processed lattice representation of ¼picture resolution. A repeating pattern for providing the segments of each of the respective processed lattice representations results from application of a 2×2 lattice scheme as described above in association with FIG. 1B. The symbols SE, SW, NE, and NW refer to the respective processed lattice representations from which the respective segments (GOPs) are derived, as further indicated by the suffix to each GOP designation indicated at the bottom of FIG. 2 (e.g., GOP1 SE referring to a GOP corresponding to the SE processed latticed representation).

As explained above, the processed lattice representations correspond to respective lattice representations of the input video signal. The SE processed lattice representation contains ¼$^{th}$ of the picture information (¼ resolution) of the intended resolution of the output picture at the decoder 124A, and its processed (e.g., compressed) version is transmitted first in a sequenced, non-overlapping manner in the aggregated video stream, as described above. Accordingly, the respective GOP (e.g., GOP1 SE, GOP2 SE, GOP3 SE, and GOP4 SE) corresponding to the SE processed lattice representation represents a time-continuous ¼ resolution GOP, with the GOPs pertaining to the other processed latticed representations (e.g., for SW, NE, and NW respectively) collectively representing the other ¾ resolution. It should be noted that a portion of the GOPs are shown, and that further GOPs to the left and right (e.g., indicated by dashes at each end) in FIG. 2 are implied. Though not shown, FIG. 2 is to be viewed with the understanding that GOPs from the corresponding processed lattice representations are the oldest starting at the bottom of FIG. 2 (SE) and proceeding to the youngest (the top of FIG. 2, or NW). "Youngest," for purposes of the present discussion, refers to those pictures from the GOPs having the latest picture output span, or largest PTS (e.g., most advanced in time). "Oldest," for purposes of the present discussion, refers to those pictures from the GOPs having the earlier picture output span, or least or smallest PTS (e.g., most current).

In FIG. 2, each interval designated respectively as T0, T1, T2, T3, and T4 (T0 and T4 partially shown) is referred to as an SDI, and in particular, each interval corresponds to a respective CRLVSDI as those terms are described above. MinC equals four to obtain a single set of complete corresponding segments. It should be noted that the order of the segments in the video stream in each CRLVSDI shown in FIG. 2 is from bottom to top (or oldest to youngest, as discussed further below). GOP4-NW, GOP4-NE, GOP4-SW, and GOP4-SE, which are respectively in segment-distribution intervals T1, T2, T3, and T4 and which correspond to lattice representations NW, NE, SW, and SE, respectively, make up complete corresponding segments. At the time GOP4-SE is provided or received, the other three corresponding segments are intended to have already been provided or received (e.g., in receiver 120A of FIG. 1A) and the GOP-4 pictures may be output at full picture resolution (e.g., the picture resolution of the input video signal). For example, receiver 120A can perform decoding in decoder 124A of the four received GOP-4 representations and then their de-latticing or composition performed in video de-latticer 126A. Likewise, complete corresponding segments, GOP3-NW, GOP3-NE, GOP3-SW, and GOP3-SE, are provided in CRLVSDIs T0, T1, T2, and T3, respectively. Thus, in general, the next minimum set of successive CRLVSDIs overlaps the prior set of successive CRLVSDIs over the last set's last (p−1) CRLVSDIs, which in FIG. 2, p=4.

In FIG. 2, a sixteen (16), ¼ resolution GOP (e.g., segments) repeating pattern per every four successive SDIs is shown and their corresponding bit buffer activity, are shown below between symbol "< >". In one embodiment, a bit buffer is dedicated to its respective processed lattice representation for a total of four (4) bit buffers, as in the present example. The relative time reference, which is denoted by a number, +N, within parentheses can be described as follows:

GOP1 SE (oldest) (+0)<bit buffer (BB)_SE, remove GOP1, leave nothing>

GOP2 SW (+1)<bit buffer (BB)_SW, remove nothing, leave GOP2>

GOP3 NE (+2)<bit buffer (BB)_NE, remove nothing, leave GOP3>

GOP4 NW (youngest) (+3)<bit buffer (BB)_NW, remove nothing, leave GOP4>—note that this point is where GOP4 collection begins, representing when a GOP begins (¼ resolution).

GOP2 SE (oldest) (+0)<bit buffer (BB)_SE, remove GOP2, leave nothing>

GOP3 SW (+1)<bit buffer (BB)_SW, remove GOP2, leave GOP3>

GOP4 NE (+2)<bit buffer (BB)_NE, remove nothing, leave GOP3,4>

GOP5 NW (youngest) (+3)<bit buffer (BB)_NW, remove nothing, leave GOP4,5>

GOP3 SE (oldest) (+0)<bit buffer (BB)_SE, remove GOP3, leave nothing>

GOP4 SW (+1)<bit buffer (BB)_SW, remove GOP3, leave GOP4>

GOP5 NE (+2)<bit buffer (BB)_NE, remove GOP3, leave GOP4,5>

GOP6 NW (youngest) (+3)<bit buffer (BB)_NW, remove nothing, leave GOP4, 5,6>

GOP4 SE (oldest) (+0)<bit buffer (BB)_SE, remove GOP4, leave nothing>—note that this point is where GOP4 collection ends, representing when a GOP ends (full resolution).

GOP5 SW (+1)<bit buffer (BB)_SW, remove GOP4, leave GOP5>

GOP6 NE (+2)<bit buffer (BB)_NE, remove GOP4, leave GOP5,6>

GOP7 NW (youngest) (+3)<bit buffer (BB)_NW, remove GOP4, leave GOP5, 6, 7>

A GOP is used above and below, for illustrative, non-limiting purposes, as an example segment.

Let DTS be the decode time stamp, PTS be the presentation time stamp, and PCR be the program clock reference or system clock, as specified in the MPEG-2 Transport specification (ISO/IEC 13818-1). GOPs received at the beginning of an SDI transmitted from the VSE 104 begin with an initial buffering delay corresponding to DTS-PCR. Continuing the example, each subsequent GOP (e.g., GOP2 SW) is sent or transmitted at a time corresponding to DTS-(PCR-"one GOP span") (e.g., DTS minus (PCR minus a span of one GOP span)), with the next (e.g., GOP3 NE) transmitted at DTS-(PCR-"two GOPs span"), and the next (e.g., GOP4 NW) at DTS-(PCR-"three GOPs span"). The "GOP span" refers to the presentation span of a GOP. Viewed from a different perspective, and with reference to FIG. 2, tuning into a given processed lattice representations within an SDI imparts a different transmission delay (and receiver-side buffering delay), where the delay is given by DTS-PCR+nSDI, where n=0, 1, 2, etc. For instance, referring to the interval T1, if one tunes into GOP2 SW, a delay of DTS-PCR+1SDI occurs before the transmission of GOP2 SE in T2 (e.g., delayed for GOP2 SW in T1). Tuning into T1 at GOP3 NE results in a delay of DTS-PCR+2SDI for the transmission of GOP3 SE (e.g., delayed for GOP3 SW and GOP3 NE). Similarly, tuning into the same SDI (T1) at GOP4 NW results in a delay of DTS-PCR+3SDI for the transmission of GOP4 SE (e.g., delay of GOP4 SW plus GOP4 NE plus GOP4 NW). Each I picture of each segment has a DTS and PTS that match the corresponding I compressed latticed pictures in the other three corresponding segments. Note that in this embodiment, corresponding latticed pictures are compressed with the same picture type or similar compression strategy or objective since, at least in one embodiment, each of the four processed lattice representations are independent processed lattice representations. Note that in certain embodiments, other mechanisms for acquiring content in the video stream may be used in lieu of a tuner.

After a channel change or a random access operation into the video stream, complete (or full) pictures become available for output no later than after the p-th CRLVSDI.

It should be noted in FIG. 2 that upon a channel change or random access operation, the video stream can be accessed at the first available CRLVSDI and decoding can start with the next (e.g., oldest) processed lattice representation (e.g., SE lattice representations), which is received when the next CRLVSDI in the video stream starts. In the worst case, pictures can be output at one p-th (e.g., one fourth in the present example) of the full resolution of the input video signal, such as when accessing or tuning into the video stream while GOP4-NW is being transmitted within T1. In such case, pictures corresponding to segment GOP2-SE in T2 are the first from the processed SE lattice representation to arrive at receiver 120A, and thus they are the first to be decompressed and output. Since the pictures of GOP2-SE represent incomplete picture data, or one-fourth of the full picture resolution of the input video signal, the compressed latticed pictures in segment GOP2 SE are decompressed and de-latticed and then upsampled with preferred upsampling methods in receiver 120A. GOP3 is processed and output immediately after GOP2 processed latticed pictures. Since GOP3-SW is provided or received prior to its corresponding segment, GOP3-SE, fifty percent of the information of the intended full picture resolution is contributed to the output pictures that correspond to GOP3. GOP4 is processed and output immediately after GOP3 pictures. Since corresponding segments, GOP4-SW and GOP4-NE, are provided or received previously in the video stream, 75 percent of the pixels of the full picture resolution are contributed from each successive set of three corresponding decompressed latticed pictures to the reconstruction of output pictures that correspond to GOP4. GOP5 can then be output using pixels from successive sets of four (or p) corresponding decompressed latticed pictures, and thus, the GOP-5 pictures can be output as complete pictures without reliance on upsampling operations to improvise for missing information.

In the previous example, upon a channel change, the picture fidelity increases gracefully from one quarter of information provided from decompressed processed lattice representation information, and the remainder of the missing pixels in the full resolution picture populated with upsampling or pixel replication methods, to half, to three-fourths, to full information provided for picture reconstruction, when no upsampling or pixel replication methods are required from then on.

The GOP2-SE processed latticed pictures, or any single segment of a processed lattice representation that is decoded and upsampled for output, provide the lowest picture fidelity level among a finite set of picture fidelity levels. In this case, there are four (or p) picture fidelity levels that correspond to the percentage of pixels of the intended full resolution of the output picture that are contributed from decompressed corresponding latticed pictures. The maximum amount of pixels results when the complete set of four (or p) decompressed corresponding latticed pictures are available to populate the intended full resolution of the output picture. The lowest picture fidelity level results when a single decompressed latticed picture (e.g., 25 percent of information) is available to reconstruct the intended full resolution of the output picture. When two or three decompressed corresponding latticed picture are available, 50 or 75 percent of the information of the intended full resolution is contributed to the output picture, respectively.

If accessing or tuning into the video stream transpires while GOP3-NE is being transmitted within CRLVSDI T1, GOP2-SE is first output by upsampling one fourth of picture information to the intended output picture size. As in the prior example, the progression of improved picture fidelity increases by contributing fifty percent of the intended pixel population of the output pictures corresponding to GOP3. Another fifty percent of upsampled pixel information obtained with preferred upsampling methods applied to the contributed fifty percent of populated information result in full resolution output pictures. However, unlike the prior example, GOP-4 pictures can be output using pixels from the four (or p) processed lattice representations since they are all available for decompression and de-latticing. In this example, full-picture reconstruction is acquired after the third CRLVSDI rather than the fourth CRLVSDI. Furthermore, the picture fidelity increases gracefully from:

1. one quarter of contributed information to the output pictures, with the remainder of the information in the output GOP-2 pictures obtained by upsampling, to 2. contributing half of the information to the output pictures, with the remainder of the information in the output GOP-3 pictures obtained by upsampling, to 3. full information contribution for the reconstruction of the output of GOP4 pictures, when no upsampling or pixel replication methods are required from then on.

If accessing or tuning into the video stream transpires while GOP2-SW is being transmitted within CRLVSDI T1, as previously discussed, GOP2-SE is first output by upsampling one fourth of picture information to the intended picture size. However, the progression of improved picture fidelity increases to 75 percent of intended pixel population in the output pictures corresponding to GOP3 since corresponding segments GOP3-SE, and GOP3-SW, and GOP3-NE have been provided or received. GOP-4 pictures can be output using pixels from the four (or p) processed lattice representations since the complete set of corresponding segments are available for decompression and de-latticing. In this example, full-picture reconstruction was acquired on the third CRLVSDI and not over four CRLVSDIs. Furthermore, the picture fidelity increases gracefully from one quarter of information contribution to the output picture, to 75 percent of the information contributed, to full intended picture reconstruction without upsampling or pixel replication required from then on.

If accessing or tuning into the video stream transpires not prior but while GOP1-SE is being transmitted within CRLVSDI T1, GOP2-SE is first output but now with 50 percent of the intended pixel information (and the rest by upsampling information) due to the fact that GOP2-SW was already received. The progression of improved picture fidelity increases to 75 percent of intended pixel population in outputting GOP-3 pictures and then to full pictures when outputting GOP-4 pictures. In this example, full-picture reconstruction was acquired again on the third CRLVSDI and not over four CRLVSDIs. However, the picture fidelity increases gracefully from pictures reconstructed from half the amount of the intended pixel information for GOP2 pictures, to 75 percent of the intended information for GOP3 pictures, to full intended picture reconstruction for the GOP4 pictures.

As described previously, the segments of processed lattice representations are provided in a video stream in sequential non-overlapping order rather than multiplexed as a set of plural streams. For instance, as shown at the bottom of FIG. 2, GOP2 SE is inserted in the stream, followed by the GOP3 SW, followed by the GOP4 NE, followed by the GOP5 NW, and so on over plural consecutive, non-overlapping SDIs (e.g., T2, T3, etc.) in a single video stream, as illustrated at the bottom of FIG. 2. Hence, each respective SDI includes four segments, or GOPs, ordered within the SDI from the oldest segment (corresponding to the SE processed lattice representation) to the youngest segment (corresponding to the NW processed lattice representation). Such an implementation may also reduce the probability of I pictures from multiple processed lattice representations being affected by a single correlated data loss event, thus, providing for better error concealment.

Continuing with the explanation of the bottom of FIG. 2, shown are segments in consecutive, non-overlapping order. Each segment symbolically represents sixteen (16, though not limited to 16) processed latticed pictures comprising an example GOP. The first segment (GOPN SE) in each interval (e.g., T1, T2, etc.) represents the oldest GOP pertaining to the SE processed lattice representation. The second segment GOPN SW, following after the first GOPN SE, represents the second youngest GOP corresponding to the SW processed lattice representation. Similarly, a third segment GOPN NE (corresponding to the NE processed lattice representation) follows the second GOPN SW, and a fourth segment GOPN NW (corresponding to the NW processed lattice representation) follows the third GOPN NE, the fourth GOPN NW representing the youngest GOP. In such a sequential ordering of segments, the PCR is a common clock reference to all four segments included in the given SDI. Each of the segments (GOPs) are separated and/or respectively extracted, and each segment contains a specified number of processed pictures, the number being equal in each segment in the SDI in one embodiment, with each segment hence representing the same time-continuous picture output span (e.g., the same time-contiguous span of presentation time). For instance, the entire picture output span of the four segments in T1 (e.g., the SDI output span), in one example, is ½ second, and each SDI output time is divided for the four segments in the respective SDI, resulting in a ⅛ second time-contiguous picture output spans for each of the segments as shown in FIG. 2. Thus, in one embodiment, each SDI includes an output picture span of ½ sec as one example output picture span. In an alternate embodiment, the output picture span of each successive SDI in the video stream is specified by the number of compressed latticed pictures in the SDI divided by the number of segments in the SDI. Note that in some embodiments, the number of bits in each of those segments is unlikely equal, but instead, the four picture output spans are equal. That is, an encoder may opt to not appropriate the same amount of bits based on a determined coding strategy to the respective non-corresponding segments in an SDI.

In one embodiment, each successive set of compressed corresponding latticed pictures in corresponding segments may further be compressed with the same picture type, encoding strategy, and/or same level of relative picture importance. In other words, if the GOP in the oldest segment comprises the transmission order sequence I, B, B, B, P, B, B, B, P, B, B, B, P, B, B, B, then the GOP in each of the other three corresponding segments is of the same sequence. By definition, corresponding latticed pictures have the same output time. Furthermore, in some embodiments, all segments, non-corresponding segments and corresponding segments, have the same number of compressed latticed pictures, and each successive compressed latticed picture in the segment is compressed with the same picture type, encoding strategy, and/or same level of relative picture importance. In some embodiments, there is a 1:1 correspondence in picture importance in corresponding segments. For instance, considering each segment to contain an ordered sequence of compressed pictures in transmission, the relative importance of the $1^{st}$ picture in the oldest segment is the same as the relative importance of the first picture of the second, third, and fourth segments within the SDI.

Although described using the same quantity of pictures in each of the segments in an SDI of the video stream, in some embodiments, the number of compressed pictures in segments may vary per SDI. That is, some implementations may change the picture output span of the SDI from one SDI to the next. Implementations that may warrant such changed intervals include personal video recording (PVR) applications, scene changes, splicing (e.g., due to a source change), instantiation of program boundaries, variable field frame encoding, variable repetition rate, and/or different type of programs or presentations (e.g., a high action or motion scenes, such as car chases, high action programs such as sports, and low motion programs such as newscasts).

In some embodiments, the number of processed latticed pictures in segments in "pseudo-SDIs" are different but every p segment in each pseudo-SDI is part of a complete set of corresponding segments in every set of p consecutive pseudo-SDIs. Pseudo-SDIs may not satisfy the fourth listed property of the SDI definition, as discussed above, since the total number of pictures in the SDI divided by the number of segments in the SDI may not equal an integer.

In addition, with regard to audio, typically audio is transmitted offset from video, since video typically has a much longer delay. In one embodiment, the audio is associated with the oldest segment (e.g., which is displayed first) of each successive SDI. That is, since the oldest segment is the first due for decoding and presentation, it represents the closest stream to current present time. Audio is referenced to the same common PCR. At the receive side, there is a first compressed picture slated for decoding and presentation that corresponds to DTS-PCR, and when the PTS for the first picture comes up, the audio corresponds to having this PTS being ordered in a manner such that audio due for output is there when the PTS is there.

Variations of the above are contemplated to be within the scope of the disclosed embodiments. For instance, fewer than four processed lattice representations may be implemented, as described further below.

Full B pictures in a single lattice representation has the benefit that compression is more efficient, and as the least important pictures, need not be protected from errors as much as other pictures that propagate information through a given interval. Thus, in one embodiment, one or more (and in one embodiment, all) of the pictures of the input video signal that are designated as non-reference pictures in compressed form are not latticed into plural lattice representations, whereas pictures of the input video signal designated as reference pictures are latticed into plural lattice representations. In such embodiments, each successive SDI in the video stream has a plurality of segments, or (p+nrs) segments, where p is greater than one and equals the segments containing compressed latticed pictures, and nrs is greater than or equal to one and equals the segments containing compressed non-reference pictures in the full picture resolution of the input video signal. Compressed pictures in one or more of the segments (i.e., the p segments) in the successive non-overlapping SDIs of the video stream contain processed latticed pictures that are of smaller picture resolution than the resolution of the pictures of the input video signal, whereas the other one or more segments (i.e., the nrs segments) contain processed pictures that are non-reference pictures and have a picture resolution equal to the resolution of the pictures of the input video signal. Thus, there is a dependence by the compressed non-reference pictures in at least one of the nrs segments in an SDI on one or more compressed reference pictures, each of which is intended to have full picture resolution by the composition of the respective decompressed version of a complete set of p corresponding latticed pictures in compressed form, and for which each of the p compressed latticed pictures is included in the same SDI as the respective p segments of compressed latticed pictures.

Referring not to FIGS. 3A-3B, shown is an illustration of one example embodiment using two lattice representations in the form of top and bottom fields. Using two lattice representations, there is a gain in compression efficiency relative to the four lattice representation case shown in FIG. 2. That is, in one embodiment, the video latticer 106 separates the incoming GOPs associated with the input signal 102 into two picture sequences comprising top field pictures and bottom field pictures (respectively, top lattice representations and bottom lattice representations). The video latticer 106 provides the two lattice representations to the video compression logic 110, which encodes the segments associated with the respective top and bottom lattice representations into two separate, independently decodable streams 302 and 304 having a common clock (e.g., same time base). As shown, processed top lattice representations corresponding to stream 302 comprise GOP1-top, GOP2-top, GOP3-top, GOP4-top, etc. Likewise, processed bottom (btm) lattice representations corresponding to stream 304 comprise GOP1-btm, GOP2-btm, GOP3-btm, GOP4-btm, etc. The processed top and bottom lattice representations are provided to the P/S logic 112, which arranges for output the GOPs from the separate streams 302 and 304 in alternating manner. For instance, as shown in output stream 306, the processed top lattice representations comprising GOP1, GOP2 are temporally dispersed (e.g., provide temporal data elasticity) in a single stream from processed top lattice representations comprising GOP3 and GOP4, by the insertion in between of the bottom lattice representations comprising GOP1 and GOP2. Improvements in burst immunity may be achieved by lengthening the GOP intervals, or in some embodiments, by increasing the amount of GOPs in each transmission interval. Further, it is noted that the same numbered GOPs among the respective lattice representations (e.g., GOP1-top and GOP1-btm) are separated by at least one intervening GOP (e.g., GOP2-top), hence providing additional burst error immunity. The time base (previously explained in the four lattice representation case illustrated in FIG. 2 for commencement of decoding and output as corresponding to the SE lattice representation) corresponds to the second set of GOPs (e.g., GOP1-btm, GOP2 btm), and not the first set shown in FIG. 3B (e.g., not GOP1-top, GOP2-top). Further, the transmission interval T1 corresponds to the interval corresponding to two GOPs encoded without LVC technology. In other words, the first transmission interval T1 comprises GOP1-top, GOP2-top, GOP1-btm, GOP2-btm.

FIGS. 4A and 4B illustrate another example of a two lattice representation case based on odd and even numbered fields. A similar technique to that described in association with FIGS. 3A-3B may be applied to arrange the output (transmission) of processed odd and even numbered pictures. That is, in one embodiment, the video latticer 106 separates the incoming GOPs associated with the input signal 102 into two picture sequences comprising odd-numbered pictures and even-numbered pictures (respectively, odd lattice representations and even lattice representations). The video latticer 106 provides the two lattice representations to the video compression logic 110, which encodes the segments associated with the respective odd and even lattice representations into two separate, independently decodable streams 402 and 404 having a common clock (e.g., same time base). As shown, processed odd lattice representations corresponding to stream 402 comprise GOP1-odd, GOP2-odd, GOP3-odd, GOP4-odd, etc. Likewise, processed even lattice representations corresponding to stream 404 comprise GOP1-even, GOP2-even, GOP3-even, GOP4-even, etc. The processed odd and even lattice representations are provided to the P/S logic 112, which arranges for output the GOPs from the separate streams 402 and 404 in alternating manner. For instance, as shown in output stream 406, the processed odd lattice representations comprising GOP1, GOP2 are temporally dispersed (e.g., provide temporal data elasticity) in a single stream from processed even lattice representations comprising GOP3 and GOP4, by the insertion in between of the even lattice representations comprising GOP1 and GOP2. Improvements in burst immunity may be achieved by lengthening the GOP intervals, or in some embodiments, increasing the amount of GOPs in a given transmission interval. Further, it is noted that the same numbered GOPs among the respective lattice representations (e.g., GOP1-odd and GOP1-even) are separated by at least one intervening GOP (e.g., GOP2-odd), hence providing additional burst error immunity. The time base (previously explained in the four lattice representation case illustrated in FIG. 2 for commencement of decoding and output as corresponding to the SE lattice representation) corresponds to the second set of GOPs (e.g., GOP1-even, GOP2 even), and not the first set shown in FIG. 4B (e.g., not GOP1-odd, GOP2-odd). Further, the transmission interval T1 corresponds to the interval corresponding to two GOPs encoded without LVC technology. In other words, the first transmission interval T1 comprises GOP1-odd, GOP2-odd, GOP1-even, GOP2-even.

Figure 5D:
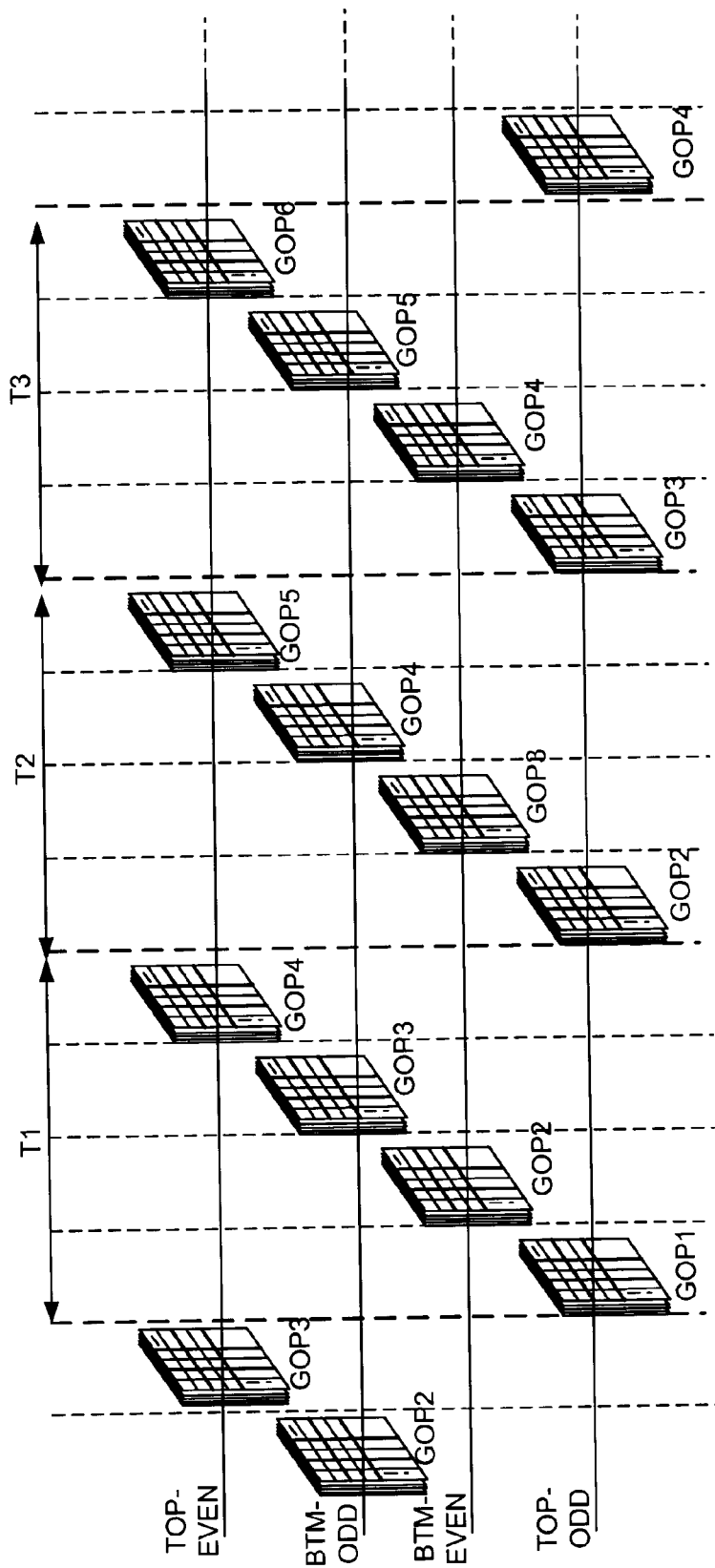

FIGS. 5A-5D are block diagrams that illustrate one example of spatial (e.g., top and bottom field pictures) and temporal (odd and even numbered pictures) ordering and outputting among transmission intervals GOPs. As shown in FIG. 5A, the video latticer 106 temporally separates the received GOPs of the input signal 102 into independently decodable odd and even numbered picture sequences 502 and 504 (two lattice representations). The video latticer 106 further spatially separates the respective sequences 502 and 504 into top and bottom field picture sequences, resulting in a total of four lattice representations: top-field, odd numbered picture sequences 506; bottom field, odd-numbered picture sequences 508; top field, even-numbered picture sequences 510; and bottom field, even-numbered picture sequences 512. The four lattice representations are provided to the encoder 108, which provides processed lattice representations and arranges the processed lattice representations in the single stream 514. The single stream 514 comprises in one transmission interval (corresponding to the transmission interval of a non-partitioned GOP), T1, a GOP corresponding to each lattice representation in increasing ordered sequence, similar to that described in association with FIG. 2. For instance, in the transmission interval T1, the sequence consists of GOP1 top-odd, GOP2 btm-even, GOP3 btm-odd, GOP4-top even. The transmission interval T2 and so on follows a similar pattern, enabling temporal continuity yet dispersion of successive GOPs of the same lattice representation.

FIG. 5D illustrates one example mechanism for arranging the four processed lattice representations, which is a similar to FIG. 2, and coincides to the stream 514 shown in FIG. 5C.

Figure 6D:
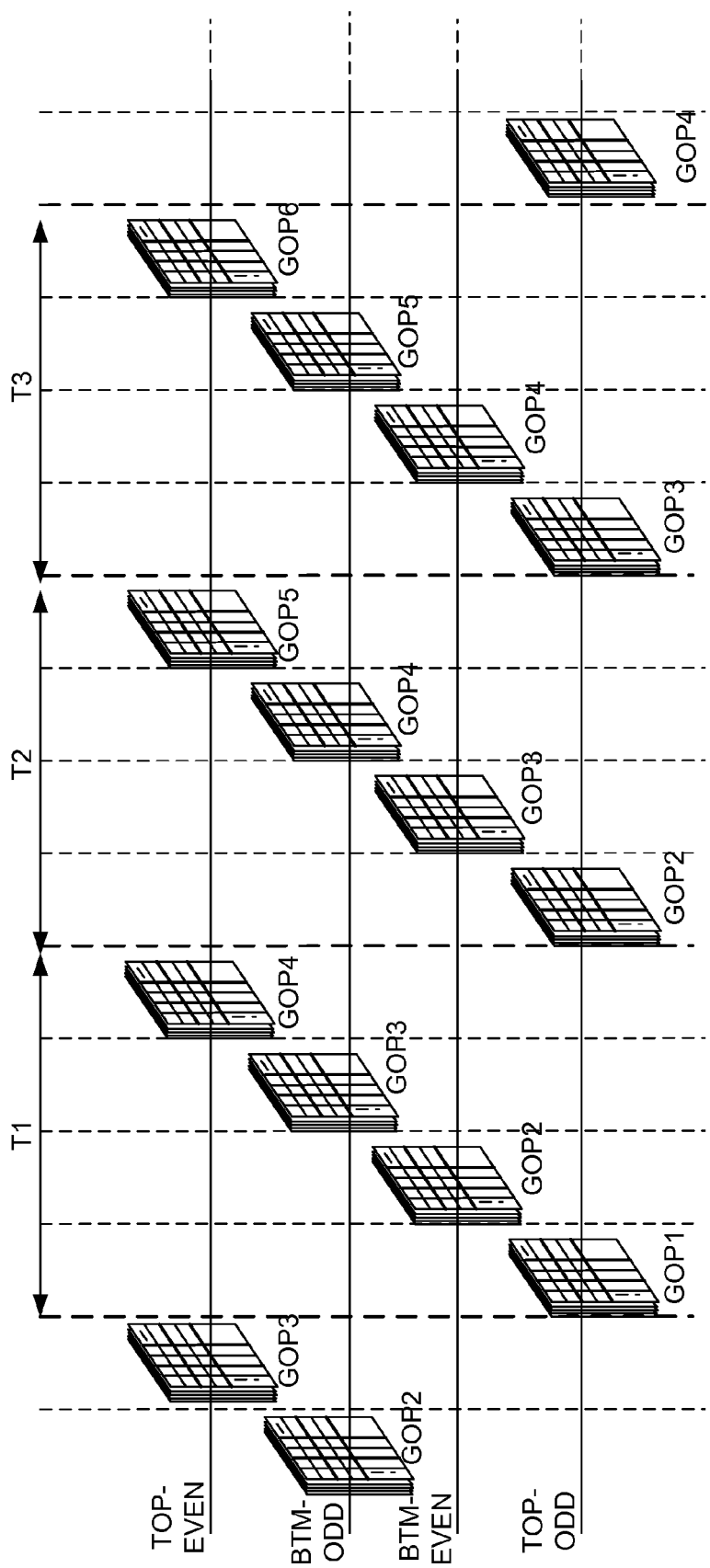

FIG. 6A is a block diagram that illustrates dependencies among lattice representations. Digressing briefly, in FIG. 2, each of the lattice representations are independently decodable, resulting in approximately equal-width GOPS as shown at the bottom of FIG. 2. Accordingly, one compromise in encoding as independently decodable streams is a loss in compression efficiency. By introducing dependencies in the lattice streams, better coding efficiency results since redundancies may be exploited across the respective lattice streams. Now referring to FIG. 6A, shown is the manner in which the processed lattice representations are encoded and then sequenced (e.g., arranged) in a stream for output from the VSE 104. That is, the stream 600 comprises similar GOP numbered ordering as shown in FIG. 2, except with differences in bit rate (as represented by the difference in size of each GOP). It is noted that the GOP1 SE 602 in FIG. 6A corresponds to the fourth received instance of the SE lattice representation as shown in FIG. 2. The last transmitted lattice representative (e.g., GOP1 SE) is the smallest of the corresponding lattice representations (e.g., smaller than GOP1 SW, GOP1 NE, GOP1, NW not shown) since it exploits both temporal and spatial redundancies of the prior received lattice representations. Conversely, the first transmitted lattice representation is expected to be the largest of the corresponding lattice representations. For instance, it is noted that GOP4 NW 604 in FIG. 6A corresponds to GOP4 NW in FIG. 2, which is the first received (or first transmitted) corresponding lattice representation of the four lattice representations (e.g., received prior to GOP4 NE, GOP4 SW, GOP4 SE). Similarly, note that GOP4 SE 606, the last received of the corresponding lattice representations (e.g., GOP4 SW, GOP4 NE, GOP4 NW), is even thinner than the corresponding lattice representations due to temporal and/or spatial dependencies exploited during the encoding of the in its decoding from one or more of the corresponding lattice representations. FIGS. 6B-6C are block diagrams that illustrate different GOP ordering/encoding alternatives.

Figures 7A, 7B:
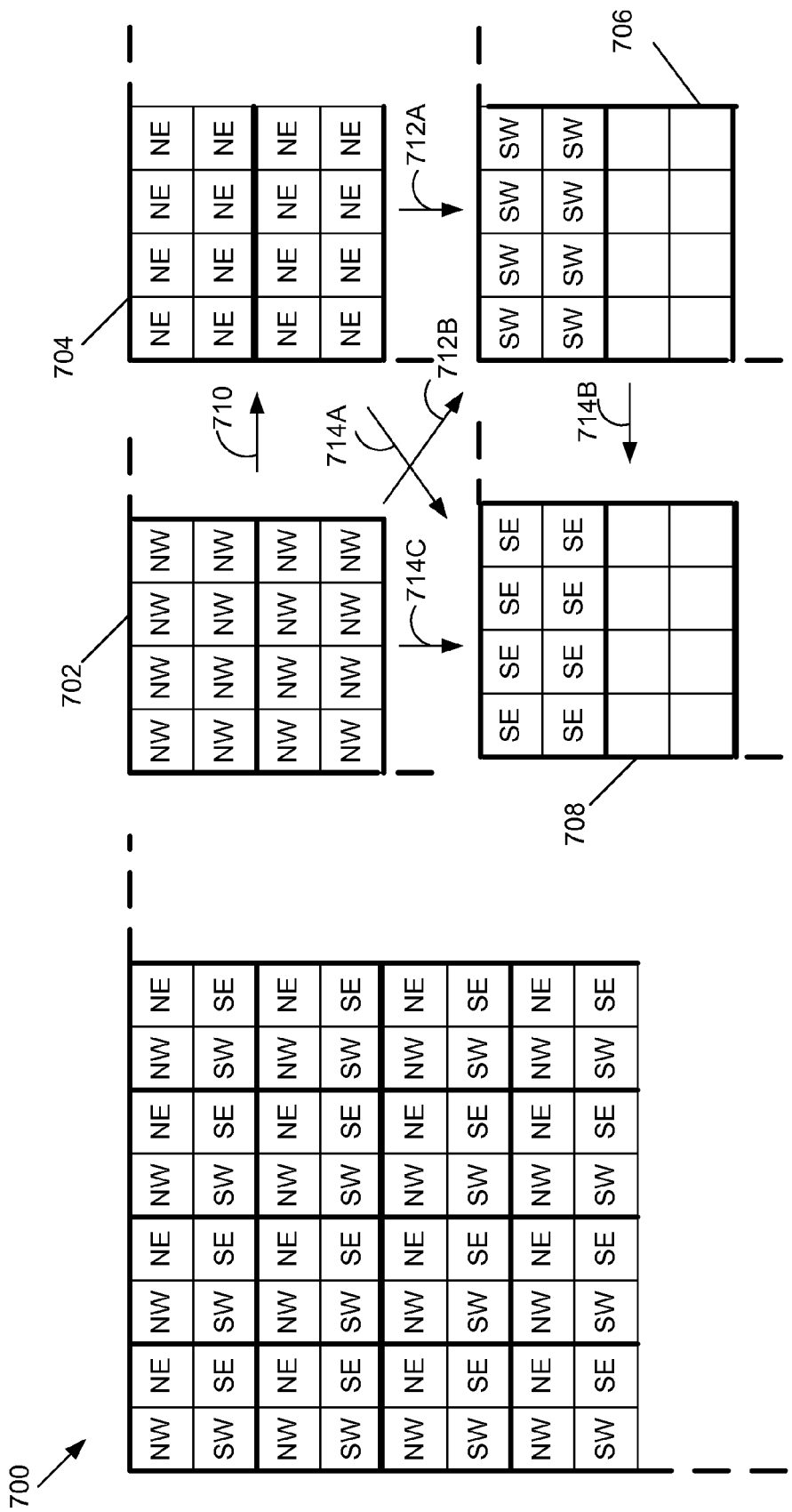
FIGS. 7A-7B are block diagrams that illustrate an example of spatial prediction employed by an embodiment of an encoder.

FIGS. 7A-7B are block diagrams that illustrate an example of spatial prediction employed by an embodiment of an encoder 108 (e.g., the video compression logic 110). In FIG. 7A, a picture 700 is partially shown, partitioned by the video latticer 106 into respective lattices (e.g., NW, NE, SW, SE) and then separated into respective lattice representations as shown in FIG. 7B as NW lattice representation 702, NE lattice representation 704, SW lattice representation 706, and SE lattice representation 708 (each partially shown). The arrows 710-714 represent the various spatial predictions that may be employed by the compression engine 110. For instance, the compression engine 110 may comprise motion estimation logic embedded therein (and the receiver decoder 124A may comprise motion compensation logic to reverse the operations of the motion estimation logic), such motion estimation logic enabling intra-prediction or spatial prediction among the different lattice representations of the same picture. For instance, referring to FIG. 7B, the transmission order expected to be produced by the encoder 108 comprises NW, NE, SW, SE. Further, the NE lattice representation 704 is intra-predicted from the NW lattice representation 702 (and motion estimated from all four lattice representations), as signified by arrow 710. Further, the SW lattice representation 706 is intra-predicted from the NW 702 and NE 704 lattice representations (and motion estimated from all four lattice representations), as signified by the arrows 712B and 712A, respectively. Also, the SE lattice representation 708 is intra-predicted from the NW 702, NE 704, and SW 706 lattice representations (and motion estimated from all four lattice representations), as signified by the arrows 714C, 714A, and 714B, respectively. In effect, it is a spatial vector that enables the prediction at a macroblock level, with low overhead (e.g., relative to AVC intra-prediction for Intra-coded or I pictures) to accomplish the results. In other words, at a macroblock level, decision may be made as to whether uni- or bi-prediction is to be employed. rather than implementing on a pixel-by-pixel basis, the different lattice representations can be considered as separate.

In view of the above described embodiments, it should be appreciated that certain embodiments of LVC systems may implement dynamic or adaptive streaming. For instance, certain embodiments of LVC systems provide for plural lattice representations, where each lattice representation includes approximately the same bit rate (hence, fidelity control is approximately linear). In one or more embodiments disclosed herein, dynamic streaming encompasses providing audio-visual content from a server (e.g., housing functionality of the VSE 104, or coupled thereto) to the receiver 120A, which in one embodiment may be embodied as a personal computer 140, through the Internet connectivity of the receiver 120A. In one embodiment, the receiver 120A comprises a media player that includes audio and video decompression capabilities. Adaptive streaming is emitted from the server. The server seamlessly switches between different bit-rate versions of a single video stream by discarding (in the case of bit-rate reduction) or aggregating (in the case of bit-rate increase) one or more latticed representations of the video content. N latticed representations are included in a container 114, which includes a file, program stream, or transport stream. The receiver's video decoder 124A smoothly adapts to the bit-rate changes in accordance with the amount of data provided by the server, while the receiver 120A continues to process pictures (e.g., decode, reconstruct and output pictures) of the video content that are made of one or more latticed representations of the video content but in which all possible latticed representations of the video (e.g., compressed latticed representations of video) share the same time base. The bit-rate varies according to network conditions or available bandwidth available from server to receiver 120A, which for instance, may be impacted through one or more gateways, routers or switches. The bit-rate may also be varied by the server to accordingly satisfy receiver throughput capabilities or decode capabilities, or according to a dynamically changing processing load or amount of resources in the receiver (such as available processor or media processor capabilities or resources, otherwise also referred to herein as network conditions).

The switch between two different bit-rates of the video content occurs by discarding or adding portions of one or more latticed representations without interrupting video decoding, reconstruction and presentation to the viewer. The receiver 120A continues to process the video content irrespective of its bit-rate.

The bit-rate of latticed representations of video targets available bandwidth to receiver 120A. Bandwidth may vary in accordance bandwidth consumption locally (e.g., within a home or premise) or within the local area network, or the geographical location or community's consumption (individually or collectively also referred to herein as network conditions). Dynamic streaming using certain LVC embodiments switches seamlessly to a higher- or lower-quality bit-rate based on available bandwidth—without ever disrupting the flow of video or audio.

The receiver 120A (or media player running in the receiver) may employ techniques such as buffer fullness (e.g., detected in association with the stream buffer 122A), data arrival, and their respective relation to a time base (such as PCRs specified in MPEG-2 systems) to monitor current bandwidth from the server to receiver 120A. Depending on the status of these monitored parameters, the receiver 120A may signal to the server its status to accordingly cause a bit-rate change.

Thus adaptive bit-rate and picture fidelity during playback of video content may vary according to available bandwidth from server to receiver 120A and based on a receiver's throughput capability.

The server may use auxiliary information, such as provided metadata (or an alternate strategy or method), that conveys how to dynamically map the required bit-rate for different intervals of times based on the number of latticed representations in a video stream (or video content) and based on the number of versions of the same content, each including plural latticed representations. The strategy or method used to manage and provide adaptive bit-rates of the video content may change according to the original picture resolution of the video content, the frame rate of the original picture (or uncompressed video), and/or on whether the video content is of progressive scan or interlaced scan format.

GOPs of latticed representations may be of a certain length in time or number of pictures. For instance, they may be five (5) seconds long or 150 pictures in length, as one non-limiting example. In one embodiment, bit-rate adjustment may be at the start of a GOP of one or more latticed representations. In some embodiments, it may be at a finer granularity (e.g., as opposed to quantum bit-rate levels) such as a picture level since certain embodiments of LVC systems and methods do not require that it be done at GOP boundaries or a RAP (entry points into the stream) since all plural latticed representations share the same time base (system clock). Discardable pictures may be removed from one or more latticed representations to reduce the bit-rate, or in some embodiments, included (if previously removed) to increase the bit-rate.

Whereas in certain implementations, such as multi-bit rate streams (MBRS), it is required to maintain a certain buffer level to switch bit-rates, switching with certain LVC embodiments is transparent by discarding or adding pictures within latticed representations at the picture level or the GOP level by discarding (bit rate reduction) or adding (increasing bit rate) one or more full GOPs of one or more latticed representations. This flexibility to adapting bit-rate changes at a granularity within a GOP of a latticed representation is attributed to the independent decodability of the lattice representations. In one embodiment of LVC systems, for adaptive streaming, the GOPs are of equal size.

As an illustrative example, assume a GOP comprising I, P, and B pictures, with the relative picture size of I:P:B comprising 15×, 5×, and 1×, respectively. Further, assume a one (1) second GOP with one I picture, nine P pictures, and 20 B pictures, and a rate of thirty (30) pictures per second. If the bit rate is 5.5 Mbs, and four (4) lattice representations are implemented, the respective bit rates in one implementation are 2, 1.5, 1, and 1. Then, 1(15×)+9(5×)+20(1×)=80×, where x is the bandwidth factor within each lattice representation. With a common time base, adaptive streaming may be achieved by dropping x*n of B pictures from SE, SW, and NE lattice representations.

Note that certain LVC embodiments discussed herein are not limited to a particular video format. Different video formats may employ different encoders and decoders. Furthermore, certain LVC embodiments are not limited to video data transmission, as similar concepts discussed herein may be employed for robust transport of audio data or other types of data. Those skilled in the art with access to the present teachings may readily modify the modules or logic of the disclosed LVC systems to meet the needs of a given implementation without undue experimentation.

While certain embodiments discussed herein are discussed primarily with respect to the processing and transport of video data, embodiments are not limited thereto. For example, other types of data, such as audio data, text, or other types of data may be latticed, ordered and/or time shifted, and transmitted in accordance with the present teachings without departing from the scope thereof.

While certain embodiments disclosed herein have has been discussed with respect to creation of four latticed video representations from an input video signal, embodiments are not limited thereto.

Although a process of the present disclosure may be presented as a single entity, such as software, instructions, or routines executing on a single machine, such software, instructions, or routines can readily be executed on multiple machines. That is, there may be multiple instances of a given software program, a single program may be executing on two or more processors in a distributed processing environment, parts of a single program may be executing on different physical machines, etc. Furthermore, two different programs can be executing in a single machine, or in different machines.

Although the LVC systems and methods have been discussed with respect to specific embodiments thereof, these embodiments are merely illustrative, and not restrictive, of the LV systems and methods. Embodiments of the present disclosure can operate between any two processes or entities including users, devices, functional systems, or combinations of hardware and software. For example, while latticing has been described herein as operating primarily upon video pictures, other portions, arrangements or groupings of video can be subjected to latticing. For example, groups of pictures (GOPs), pictures, frames, or other layers or portions of video content may be subjected to latticing.

Any suitable programming language can be used to implement the routines or other instructions employed by various network entities. Example programming languages include C, C++, Java, assembly language, etc. Different programming techniques can be employed such as procedural or object oriented. The routines can execute on a single processing device or multiple processors. The routines can operate in an operating system environment or as stand-alone routines occupying all, or a substantial part, of the system processing.

In the description herein, numerous specific details are provided, such as examples of components and/or methods, to provide a thorough understanding of embodiments of the present disclosure. One skilled in the relevant art will recognize, however, that an embodiment of the disclosure can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present disclosure.

A "processor" or "process" includes any hardware and/or software system, mechanism or component that processes data, signals or other information. The VSE 104 and/or receivers 120A, 120B may include one or more processors executing logic (e.g., software encoded on a tangible computer readable medium), and such processor(s) may include a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", "a specific embodiment", of "an implementation" means that a particular feature, structure, or characteristic described in connection with the embodiment is included in at least one embodiment of the present disclosure and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present disclosure may be combined in any suitable manner with one or more other embodiments. It is to be understood that other variations and modifications of the embodiments of the present disclosure described and illustrated herein are possible in light of the teachings herein and are to be considered as part of the spirit and scope of the present disclosure.

Certain LVC system embodiments of the disclosure may be implemented in whole or in part by using a programmed general purpose digital computer; by using application specific integrated circuits, programmable logic devices, field programmable gate arrays, optical, chemical, biological, quantum or nanoengineered systems or mechanisms; and so on. Distributed or networked systems, components, and/or circuits can be used. Communication, or transfer of data, may be achieved via wired, wireless, or by any other means.

It should also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present disclosure to implement a program or code that can be stored in a computer-readable storage medium or device to permit a computing system to perform any of the methods described above.

Additionally, any signal arrows in the drawings/figures should be considered only as examples, and not limiting, unless otherwise specifically noted. For example, an arrow on a signal path indicating communication in one direction does not necessitate that communication along that signal path is limited to that one direction.

Furthermore, the term "or" as used herein is generally intended to mean "and/or"unless otherwise indicated. In addition, the term "includes" is taken to mean "includes but is not limited to." Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present disclosure, including what is described in the Abstract, is not intended to be exhaustive or to limit the disclosure to the precise forms disclosed herein. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments.

Thus, while the present disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope of the disclosure. Therefore, many modifications may be made to adapt a particular situation or material to the essential scope of the present disclosure. It is intended that the disclosure not be limited to the particular terms used in following claims and/or to the particular embodiment disclosed as the best mode contemplated for carrying out this disclosure, but that the disclosure will include any and all embodiments and equivalents falling within the scope of the appended claims.

The invention claimed is:

1. A method, comprising:

partitioning a first sequence of pictures into plural representations, the first sequence of pictures having plural contiguous, non-overlapping segments, each of the plural segments having a single corresponding segment in each of the plural representations, the first sequence of pictures having a first spatial resolution and a first temporal resolution, each of the plural representations having a respective sequence of latticed pictures representing a distinct set of pixels of the first sequence of pictures, the plural representations collectively comprising the first spatial resolution and the first temporal resolution;

encoding each of the plural representations independently of each other with a common time base, each encoded representation having a respective bit-rate, the plural encoded representations having an aggregate bit-rate;

providing a first portion of the plural encoded representations based on a first network condition, the first portion having a first bit-rate; and providing a second portion of the plural encoded representations having a second bit-rate different than the first bit-rate, wherein a switch from providing the first portion to providing the second portion is responsive to a second network condition different than the first network condition; receiving the encoded representations at a communications and decoding the latticed pictures of a first segment;

forming pictures by de-latticing the decoded latticed-pictures of the first segment; and providing the de-latticed pictures of the first segment for display at a partial picture resolution of the corresponding pictures of the video signal, the partial resolution corresponding to a picture resolution of 1/p, where p equals the number of arranged plural segments.

2. The method of claim 1, wherein either the first or second network conditions comprise a change in network bandwidth.

3. The method of claim 1, wherein either the first or second network conditions comprise a change in network device resources.

4. The method of claim 1, wherein the providing of the first and second portion comprises providing to a server.

5. The method of claim 1, wherein the providing of the first and second portion comprises providing to a network storage device.

6. The method of claim 1, wherein the providing of the first and second portion comprises providing over an Internet connection to a receiver.

7. The method of claim 6, wherein the receiver comprises a personal computer.

8. The method of claim 6, wherein the providing of the second portion is based on discarding one or more of the plural encoded representations without manifesting an interruption in a presentation of the first sequence of pictures to a viewer associated with the receiver.

9. The method of claim 6, wherein the providing of the second portion is based on aggregating one or more of the plural encoded representations without manifesting an interruption in a presentation of the first sequence of pictures to a viewer associated with the receiver.

10. The method of claim 6, wherein the providing of the second portion is further responsive to a signal from the receiver.

11. The method of claim 1, wherein the providing of the second portion is implemented at a location different from a groups of pictures (GOP) boundary or random access point (RAP).

12. A method, comprising:
receiving at a network device a first portion of plural encoded representations based on a first network condition, the first portion having a first bit-rate, the plural encoded representations independently decodable and having a common time base, each encoded representation having a respective bit-rate, the plural encoded representations having an aggregate bit-rate, the plural encoded representations corresponding to a plural representations derived from a first sequence of pictures, the first sequence of pictures having plural contiguous, non-overlapping segments, each of the plural segments having a single corresponding segment in each of the plural representations, the first sequence of pictures having a first spatial resolution and a first temporal resolution, each of the plural representations having a respective sequence of latticed pictures representing a distinct set of pixels of the first sequence of pictures, the plural representations collectively comprising the first spatial resolution and the first temporal resolution; and
receiving at the network device a second portion of the encoded plural representations having a second bit-rate different than the first bit-rate, wherein a switch from receiving the first portion to receiving the second portion is responsive to a second network condition different than the first network condition receiving the encoded representations at and decoding the latticed pictures of a first segment;
forming pictures by de-latticing the decoded latticed-pictures of the first segment; and
providing the de-latticed pictures of the first segment for display at a partial picture resolution of the corresponding pictures of the video signal, the partial resolution corresponding to a picture resolution of 1/p, where p equals the number of arranged plural segments.

13. The method of claim 12, wherein either the first or second network conditions comprise a change in network bandwidth, a change in available resources of the network device, or a combination of both.

14. The method of claim 12, wherein the receiving of the first and second portion comprises receiving from a server over an Internet connection.

15. The method of claim 12, wherein the second portion differs from the first portion in the number of encoded plural representations, further comprising decoding and presenting for output the first portion followed by decoding and presenting for output the second portion without manifesting an interruption of the presentation to a viewer associated with the receiver.

16. The method of claim 12, further comprising monitoring by the network device one or more parameters, and responsive to a change in status of the one or more parameters, signaling to a server to switch from providing the first portion to the second portion.

17. The method of claim 16, wherein the one or more parameters comprises buffer fullness, data arrival, current bandwidth, or decoding ability, or a combination of two or more.

18. A system, comprising:
a first network device, comprising:
a memory comprising logic; and
a processor configured to execute the logic to cause the processor to:
partition a first sequence of pictures into plural representations, the first sequence of pictures having plural contiguous, non-overlapping segments, each of the plural segments having a single corresponding segment in each of the plural representations, the first sequence of pictures having a first spatial resolution and a first temporal resolution, each of the plural representations representing a distinct set of pixels of the first sequence of pictures, the plural representations collectively comprising the first spatial resolution and the first temporal resolution;
encode each of the plural representations independently of each other with a common time base, each encoded representation having a respective sequence of latticed pictures having a respective bit-rate, the plural encoded representations having an aggregate bit-rate;
provide a first portion of the plural encoded representations based on a first network condition, the first portion having a first bit-rate; and
provide a second portion of the plural encoded representations having a second bit-rate different than the first bit-rate, wherein a switch from providing the first portion to providing the second portion is responsive to a second network condition different than the first network condition decode the latticed pictures of a first segment;
form pictures by de-latticing the decoded latticed-pictures of the first segment; and
provide the de-latticed pictures of the first segment for display at a partial picture resolution of the corresponding pictures of the video signal, the partial resolution corresponding to a picture resolution of 1/p, where p equals the number of arranged plural segments.

19. The system of claim 18, wherein the processor further executes the logic to provide the second portion based on either:
discarding one or more of the plural encoded representations without manifesting an interruption in a presentation of the first sequence of pictures to a viewer associated with the receiver; or aggregating one or more of the plural encoded representations without manifesting an interruption in the presentation of the first sequence of pictures to the viewer.

20. The system of claim 18, further comprising a second network device, wherein the second network device comprises a stream buffer, a memory with logic, and a processor configured to execute the logic to:

monitoring one or more parameters, wherein the one or more parameters comprises buffer fullness, data arrival, current bandwidth, or decoding ability, or a combination of two or more; and responsive to a change in status of the one or more parameters, signal to the first network device to switch from providing the first portion to the second portion.

* * * * *